(12) United States Patent
Cardozo et al.

(10) Patent No.: US 9,693,311 B2
(45) Date of Patent: Jun. 27, 2017

(54) METHOD OF PROVIDING USER WITH BATTERY POWER NOTIFICATION IN MOBILE DEVICE AND MOBILE DEVICE THEREFOR

(71) Applicant: SAMSUNG ELECTRONICS CO., LTD., Suwon-si (KR)

(72) Inventors: Nigel Cardozo, Staines (GB); Kupesan Kulendiran, Staines (GB); Rohit Ail, Staines (GB); Sunil Sudhakaran, Staines (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/845,748

(22) Filed: Sep. 4, 2015

(65) Prior Publication Data

US 2016/0073351 A1 Mar. 10, 2016

(30) Foreign Application Priority Data

Sep. 4, 2014 (GB) .................................. 1415659.0
Jun. 8, 2015 (KR) ........................ 10-2015-0080836

(51) Int. Cl.
*H04B 1/38* (2015.01)
*H04M 1/00* (2006.01)
(Continued)

(52) U.S. Cl.
CPC .......... *H04W 52/0258* (2013.01); *G06F 1/28* (2013.01); *G06F 1/3206* (2013.01); *G06F 1/329* (2013.01);
(Continued)

(58) Field of Classification Search
CPC ......... H04W 52/0258; H04W 52/0261; H04W 52/0264; G06F 1/28; Y02B 60/50
See application file for complete search history.

(56) References Cited

U.S. PATENT DOCUMENTS 5,684,404 A 11/1997 Millar
8,090,415 B2 1/2012 Annambhotla et al.
(Continued)

FOREIGN PATENT DOCUMENTS

EP 2501183 A1 9/2012
FR 2857100 A1 1/2005
(Continued)

OTHER PUBLICATIONS

Search Report issued Nov. 26, 2015, issued by the International Searching Authority in counterpart International Patent Application No. PCT/KR2015/009282 (PCT/ISA/210).
(Continued)

*Primary Examiner* — Nguyen Vo
(74) *Attorney, Agent, or Firm* — Sughrue Mion, PLLC

(57) ABSTRACT

A method of providing a user with a battery power notification in a mobile device and the mobile device therefor are provided. The method includes determining a future application to be run on the mobile device, determining whether a remaining battery life of the mobile device is enough to run the future application, based on a power consumption of a preceding application running before the future application, and outputting a notification indicating a battery insufficiency of the mobile device in response to the determining that the remaining battery life is not enough.

20 Claims, 29 Drawing Sheets

(51) Int. Cl.
*H04W 52/02* (2009.01)
*G06F 1/28* (2006.01)
*G06F 1/32* (2006.01)
*G06F 9/46* (2006.01)

(52) U.S. Cl.
CPC .............. *G06F 1/3212* (2013.01); *G06F 9/46* (2013.01); *H04W 52/0277* (2013.01); *Y02B 60/50* (2013.01)

(56) References Cited

U.S. PATENT DOCUMENTS

| | | | |
|---|---|---|---|
| 8,515,499 | B1 | 8/2013 | Stekkelpak et al. |
| 2002/0086718 | A1 | 7/2002 | Bigwood et al. |
| 2004/0180701 | A1 | 9/2004 | Livet et al. |
| 2006/0019723 | A1 | 1/2006 | Vorenkamp et al. |
| 2008/0097913 | A1 | 4/2008 | Dicks et al. |
| 2008/0307243 | A1 | 12/2008 | Lee |
| 2011/0071780 | A1 | 3/2011 | Tarkoma |
| 2011/0072292 | A1* | 3/2011 | Khawand ............. G06F 1/3203 713/340 |
| 2012/0013474 | A1* | 1/2012 | Martinoli ................. G06F 1/28 340/636.1 |
| 2012/0066332 | A1 | 3/2012 | Deprun |
| 2012/0210150 | A1 | 8/2012 | de Lind Van Wijngaarden et al. |
| 2012/0262303 | A1* | 10/2012 | Fahey ................. A61B 5/0006 340/870.02 |
| 2013/0331119 | A1* | 12/2013 | Vaccari .................. H04W 4/02 455/456.1 |
| 2013/0332940 | A1 | 12/2013 | Hackborn et al. |
| 2014/0095091 | A1 | 4/2014 | Moore et al. |
| 2014/0267770 | A1* | 9/2014 | Gervautz ........... H04N 5/23296 348/169 |

FOREIGN PATENT DOCUMENTS

| | | |
|---|---|---|
| GB | 2341760 A | 3/2000 |
| GB | 2497082 A | 6/2013 |
| JP | 2005-293519 A | 10/2005 |
| WO | 2010/131860 A2 | 11/2010 |

OTHER PUBLICATIONS

Written Opinion issued Nov. 26, 2015, issued by the International Searching Authority in counterpart International Patent Application No. PCT/KR2015/009282 (PCT/ISA/237).
Communication dated Feb. 16, 2015, issued by the Intellectual Property Office of the United Kingdom in counterpart application No. GB1415659.0.
Communication dated Jul. 20, 2015, issued by the Intellectual Property Office of the United Kingdom in counterpart application No. GB1415659.0.
U.S. Department of Health and Human Services Food and Drug Administration et al., "Mobile Medical Applications—Guidance for Industry and Food and Drug Administration Staff", Feb. 9, 2015, 44 pages total.
Comstock, "Samsung gets FDA clearance for S Health App", mobihealthnews, Jan. 2, 2014, 9 pages total.
"Juice Defender App", Jan. 15, 2012, 6 pages total, Latedroid.
"GreenPower Free Battery Saver", Jul. 27, 2015, 6 pages total, Binary Mango AS.
Communication issued Dec. 27, 2016, issued by the Korean Intellectual Property Office in counterpart Korean Patent Application No. 10-2015-0080836.

* cited by examiner

METHOD OF PROVIDING USER WITH BATTERY POWER NOTIFICATION IN MOBILE DEVICE AND MOBILE DEVICE THEREFOR

CROSS-REFERENCE TO RELATED APPLICATIONS

This application claims priority from Korean Patent Application No. 10-2015-0080836, filed on Jun. 8, 2015, in the Korean Intellectual Property Office, and British Patent Application No. GB1415659.0, filed on Sep. 4, 2014, in the Intellectual Property Office of the United Kingdom, the disclosures of which are incorporated herein by reference in their entireties.

BACKGROUND

1. Field

Methods and apparatus consistent with exemplary embodiments relate to a method of providing a user with a battery power notification in a mobile device and the mobile device therefor.

2. Description of the Related Art

Users of mobile devices, e.g., mobile phones or tablets, utilize the mobile devices differently at different times. For example, some users may use the mobile devices very little when in an office but a lot at home, and some users may use the mobile devices more during the weekends rather than during weekdays.

Due to the recent rapid improvement in performance of mobile devices, users may use various applications for not only communicating (via voice, text, etc.), but also for watching movies, browsing the Internet, health monitoring, and playing games, without limitation of time and location. Accordingly, usage of batteries of the mobile device has rapidly increased.

Because the applications running in the mobile devices have different rates of power consumption, efficient battery monitoring schemes prevent battery power of the mobile devices from quickly running out.

Generally, current battery monitoring schemes of mobile devices are limited to simply informing a user when a battery level reaches a level, for example, displaying a 'battery low' message if capacity of a battery reaches 20% or 10% remaining capacity. However, although a remaining battery life may last for different amounts of time depending on a type and the number of applications being run on a mobile device of the users, the user is only notified about the remaining battery life according to the current battery monitoring schemes. In this case, after the user has used the mobile device for a long time, the user may then recognize that the battery capacity is not enough to run a future application.

In some cases, the user may have forgotten about future work to be performed using the mobile device and realize that the battery capacity is not sufficient when the work has to be commenced.

The user may have a peripheral device that is paired with his or her mobile device, for example, a headset, a 'hands-free' device, a smart watch, a wearable device using an embedded subscriber identification module (SIM), or health monitoring equipment. Such peripheral devices are not able to inform the user of their current or predicted battery levels. Therefore, when the user of the mobile device has to use the mobile device in connection with the peripheral device, the user may not receive a notification about whether the remaining battery life of the peripheral device is sufficient for future work to be performed using the mobile device, and thus, the user has to manually check the battery of the peripheral device in advance.

SUMMARY

Exemplary embodiments address at least the above problems and/or disadvantages and other disadvantages not described above. Also, one or more exemplary embodiments are not required to overcome the disadvantages described above, and an exemplary embodiment may not overcome any of the problems described above.

Aspects of one or more exemplary embodiments provide a method and a mobile device for providing a battery power notification of whether capacity of a battery is enough to run a future application.

Aspects of one or more exemplary embodiments provide a method and a mobile device for providing a 'battery low' notification in a peripheral device.

Aspects of one or more exemplary embodiments provide a method and a mobile device for providing a battery power notification of whether battery capacity is enough to run a future application in response to a request from a remote device.

According to an aspect of an exemplary embodiment, there is provided a method of providing a battery power notification in a mobile device to a user, the method including determining a future application to be run on the mobile device, determining whether a remaining battery life of the mobile device is enough to run the future application, based on a power consumption of a preceding application running before the future application, and outputting a notification indicating a battery insufficiency of the mobile device in response to the determining that the remaining battery life is not enough.

The method may further include receiving, from a peripheral device that is used to run the future application, information of a remaining battery life of the peripheral device, determining whether the remaining battery life of the peripheral device is enough to run the future application, based on the power consumption of the preceding application, and outputting an alarm indicating a battery insufficiency of the peripheral device in response to the determining that the remaining battery life of the peripheral device is not enough.

The determining the future application may include determining the future application based on a usage pattern of the user of the mobile device.

The method may further include receiving, from a remote device, a request to run an application. The determining the future application may include determining the requested application as the future application.

The outputting may include outputting, to the remote device, the notification indicating the battery insufficiency of the mobile device in response to the determining that the remaining battery life is not enough.

The method may further include closing a currently running application of the mobile device to save battery power to perform an operation based on the request.

The outputting may include displaying a list of applications to be closed, among currently running applications or hardware modules of the mobile device, to save energy to run the future application.

The list may include applications with an importance level less than an importance level of the future application.

The method may further include calculating a remaining runtime of a currently running application of a mobile device, based on a power consumption of the currently running application, and displaying the remaining runtime.

The method may further include monitoring usage of the mobile device for a period of time, generating a power profile indicating power consumptions of currently running applications of the mobile device, based on the monitored usage, and determining a power consumption of the future application and the power consumption of the preceding application based on the power profile.

According to an aspect of another exemplary embodiment, a mobile device includes a controller configured to determine a future application to run on the mobile device, determine whether a remaining battery life of the mobile device is enough to run the future application, based on a power consumption of a preceding application running before the future application, and output a notification indicating a battery insufficiency of the mobile device in response to the controller determining that the remaining battery life is not enough.

The controller may be further configured to receive, from a peripheral device that is used to run the future application, information of a remaining battery life of the peripheral device, determine whether the remaining battery life of the peripheral device is enough to run the future application, based on the power consumption of the preceding application, and output an alarm indicating a battery insufficiency of the peripheral device in response to the controller determining that the remaining battery life of the peripheral device is not enough.

The controller may be configured to determine the future application based on a usage pattern of a user of the mobile device.

The controller may be further configured to receive, from a remote device, a request to run an application, and determine the requested application as the future application.

The controller may be configured to output, to the remote device, the notification indicating the battery insufficiency of the mobile device in response to the controller determining that the remaining battery life is not enough.

The controller may be further configured to close a currently running application of the mobile device to save battery power to perform an operation based on the request.

The mobile device may further include a display, and the controller may be configured to control the display to display a list of applications to be closed, among currently running applications or hardware modules of the mobile device, to save energy to run the future application.

The mobile device may further include a display, and the controller may be further configured to calculate a remaining runtime of a currently running application of a mobile device, based on a power consumption of the currently running application, and control the display to display the remaining runtime.

The controller may be further configured to monitor usage of the mobile device for a period of time, generate a power profile indicating power consumptions of currently running applications of the mobile device, based on the monitored usage, and determine a power consumption of the future application and the power consumption of the preceding application based on the power profile.

According to an aspect of another exemplary embodiment, there is provided a non-transitory computer-readable storage medium storing a program including instructions for causing a computer to perform a method of providing a battery power notification in a mobile device to a user, the method including determining a future application to be run on the mobile device, determining whether a remaining battery life of the mobile device is enough to run the future application, based on a power consumption of a preceding application running before the future application, and outputting a notification indicating a battery insufficiency of the mobile device in response to the determining that the remaining battery life is not enough.

According to an aspect of another exemplary embodiment, a mobile device includes a controller configured to determine a future event to run on the mobile device, among events, based on importance levels of the events, determine whether a remaining capacity of a battery of the mobile device is enough to perform the future event, based on a power that is consumed by a preceding event running before the future event, among the events, and output a notification indicating that the remaining capacity of the battery is not enough in response to the controller determining that the remaining capacity of the battery is not enough.

The mobile device may further include a display, and the controller may be further configured to control the display to display the notification including the future event, information that the remaining capacity of the battery is not enough to perform the future event, and an action to be performed so that the remaining capacity of the battery is enough to perform the future event.

BRIEF DESCRIPTION OF THE DRAWINGS

The above and/or other aspects will be more apparent by describing exemplary embodiments with reference to the accompanying drawings, in which.

DETAILED DESCRIPTION

Figure 1:
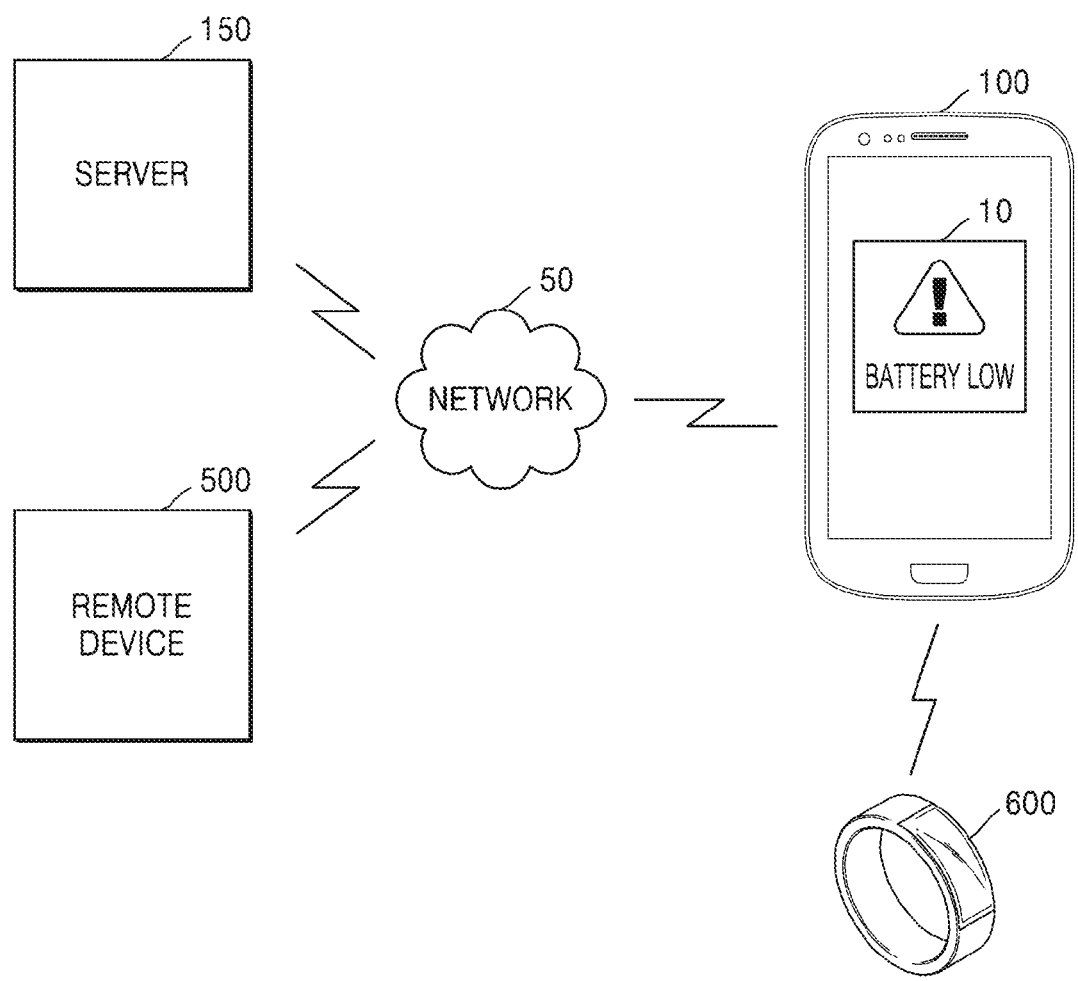
FIG. 1 is a diagram of a system providing a battery power notification in a mobile device, according to exemplary embodiments.

Exemplary embodiments are described in greater detail with reference to the accompanying drawings.

Exemplary embodiments of the present disclosure may be diversely modified. Accordingly, exemplary embodiments are illustrated in the drawings and are described in detail in the detailed description. However, it is to be understood that the present disclosure is not limited to an exemplary embodiment, but includes all modifications, equivalents, and substitutions without departing from the scope and spirit of the present disclosure. Also, well-known functions or constructions may not be described in detail because they would obscure the disclosure with unnecessary detail.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters.

Terms such as "comprising" or "may comprise" that may be used in the one or more exemplary embodiments indicate the existence of a disclosed function, operation, or element, and are not intended to preclude additional functions, operations, or elements. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Terms such as "or" in the one or more exemplary embodiments include any and all combinations of one or more of the associated listed items. For example, "A or B" may include A, may include B, or may include A and B.

While terms such as "first," "second," etc. in the one or more exemplary embodiment may be used to describe various components, such components may not be limited to the above terms. For example, the above terms are not intended to limit the order and/or importance level. The above terms may be used to distinguish a component from another component. For example, a first user device and a second user device are all user devices but indicate different user devices. For example, within the scope of the one or more exemplary embodiments, a first component may be referred to as a second component, and vice versa.

It will be understood that when a component is referred to as being "connected to" or "paired to" another component, the component may be directly connected to or coupled to the other component, or an intervening component may be present. On the other hand, when a component is referred to as being "directly connected to" or "directly paired to" another component, other intervening components are not present.

An electronic device according to the one or more exemplary embodiments may be a device with communication functions. For example, the electronic device may include at least one of a smartphone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, and a wearable device (e.g., a head mounted device (HMD) such as electronic glasses, electronic clothes, an electronic bracelet, an electronic necklace, an electronic appcessory, an electronic tattoo, or a smart watch).

The electronic device according to the one or more exemplary embodiments may include one or a combination of at least two of the devices above. Alternatively, the electronic device according to the one or more exemplary embodiments may be a flexible device. Also, it should be understood by one of ordinary skill in the art that the electronic device according to the one or more exemplary embodiments is not limited to the devices above.

The term "user" used in the one or more exemplary embodiments may indicate a human or an electronic device (e.g., an artificial intelligence electronic device) that uses the electronic device.

Expressions such as "at least one of," when preceding a list of elements, modify the entire list of elements and do not modify the individual elements of the list.

FIG. 1 is a diagram of a system providing a battery power notification in a mobile device, according to exemplary embodiments.

Referring to FIG. 1, the system includes a mobile device 100, a remote device 500, a peripheral device 600, and a server 150 that may communicate via a network 50.

The mobile device 100 may determine whether a remaining battery life of the mobile device 100 is enough to run future applications based on at least one application that is being run in the mobile device 100, and based on the determination, may output a notification 10 informing that battery power of the mobile device 100 is low. Through such a notification, the mobile device 100 may inform a user in advance about potential issues related to a current remaining battery life, with regard to future usage schedules or usage patterns of the user.

According to one or more exemplary embodiments, an application may include an SMS/MMS application, an e-mail application, a calendar application, an alarm application, a health care application (e.g., an application estimating exercise amount or blood sugar), an environment information application (e.g., an application providing atmospheric pressure, humidity, or temperature information), or a notification transmission application.

For example, the notification transmission application may include a function of transmitting notification information generated by other applications of the mobile device 100 (e.g., an SMS/MMS application, an e-mail application, a health care application, or environment information application) to an external device.

According to one or more exemplary embodiments, the application may include an application that is defined according to properties (e.g., a type of an electronic device) of the external device. For example, when the external device is an MP3 player, the application may include an application related to playing music. Similarly, when the external device is a mobile medical device, the application may include an application related to health care.

The mobile device 100 may receive an application execution request from the remote device 500 via the network 50. In response to the request from the remote device 500, the mobile device 100 may determine the application as a future application that is to be performed. Also, when a remaining battery life is not enough to run the application, the mobile device 100 may transmit a battery shortage status of the mobile device 100 to the remote device 500 via the network 50.

The mobile device 100 may receive, via the network 50, remaining battery life information of the peripheral device 600 from the peripheral device 600 that is used to run an application. The mobile device 100 may determine whether the remaining battery life of the peripheral device 600 is enough to run the application based on the remaining battery life information of the peripheral device 600, and based on the determination, selectively output a notification informing that battery power of the peripheral device 600 is low.

The mobile device 100 may transmit data that is obtained by monitoring usage of the mobile device 100 to the server 150 via the network 50.

The remote device 500 may be connected with the mobile device 100 via the network 50. The remote device 500 may transmit an application execution request to the mobile device 100 via the network 50.

The peripheral device 600 may be wired or wirelessly connected with the mobile device 100. The wireless communication option may include at least one of, for example, Wi-Fi, Bluetooth, near field communication (NFC), global positioning system (GPS), and cellular communication (e.g., LTE, LTE-A, CDMA, WCDMA, UMTS, WiBro, or GSM). The wired communication option may include, at least one of, for example, a universal serial bus (USB), high definition multimedia interface (HDMI), recommended standard 232 (RS-232), and plain old telephone service (POTS).

The peripheral device 600 may transmit the remaining battery life information of the peripheral device 600 to the mobile device 100.

The server 150 may receive the data that is obtained by monitoring the usage of the mobile device 100 from the mobile device 100 via the network 50 and store the data.

The network 50 may be a telecommunications network. The telecommunications network may include at least one of a computer network, the Internet, the Internet of Things (IoT), and a telephone network.

In the system shown in FIG. 1, although the mobile device 100, the remote device 500, the peripheral device 600, and the server 150 are devices that may be referred to as electronic devices or computing devices and operate including a communicator and a processor, in the present specification, the devices will be referred to as a mobile device, a remote device, a peripheral device, and a server, respectively, for convenience of description.

Figure 2A:
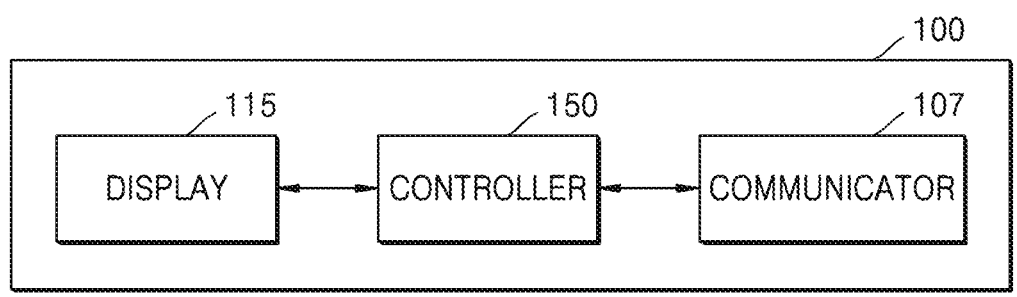
FIG. 2A is a block diagram of a mobile device, according to an exemplary embodiment.

FIG. 2A is a block diagram of the mobile device 100, according to an exemplary embodiment.

Referring to FIG. 2A, the mobile device 100 includes a controller 150, a communicator 107, and a display 115.

The display 115 may output a screen that is provided by the controller 150. The display 115 may provide a battery power notification through the screen.

The communicator 107 allows the mobile device 100 to communicate with an external device, i.e., the server 150, the remote device 500, and the peripheral device 600.

The controller 150 controls components of the mobile device 100, including the display 115 and the communicator 107. The controller 150 may include a RAM that stores signals or data input from an external device of the mobile device 100 or used as a storage for various operations performed by the mobile device 100, a ROM that stores a control program for controlling a peripheral device, or a processor. The processor may be implemented as a system on chip (SoC) that integrates a core and a graphic processing unit (GPU). The processor may include a single-core, dual-core, triple-core, quad-core, and other multi-core processor.

Also, the processor may include a plurality of processors. For example, the processor may be implemented as a main processor and a sub-processor that operates in a sleep mode.

According to an exemplary embodiment, the controller 150 may determine a future application in the mobile device 100, and determine whether a current remaining battery life is enough to run the future application based on power consumption of at least one other application that is to be run before the future application. Based on the determination, the controller 150 may selectively output a notification informing that battery power of the mobile device 100 is low.

According to an exemplary embodiment, the controller 150 may receive remaining battery life information of the peripheral device 600 that is used to run the future application, and based on the received information, the controller 150 may determine whether a remaining battery life of the peripheral device 600 is enough to run the future application. Based on the determination, the controller 150 may selectively output a notification informing that battery power of the peripheral device 600 is low.

According to an exemplary embodiment, the controller 150 may determine the future application based on a usage pattern of the mobile device.

According to an exemplary embodiment, when the controller 150 receives an application execution request from the remote device 500, the controller 150 may determine the application as the future application.

According to an exemplary embodiment, when the current remaining battery life is determined to be not enough to run the application that is requested by the remote device 500, the controller 150 may inform a 'battery low' status of the mobile device 100) to the remote device 500.

According to an exemplary embodiment, the controller 150 may close at least one currently-running application, to save remaining battery life to run the future application.

According to an exemplary embodiment, the controller 150 may display, via the display 115, one or more applications to be closed to save power for running the future application, among the currently-running applications, or a list of hardware modules of the mobile device 100 to be deactivated.

According to an exemplary embodiment, the list may include applications with a lower importance level than the future application according to predetermined importance levels of the applications.

According to an exemplary embodiment, the controller 150 may calculate how much longer a currently-running application may be run based on the power consumption of the currently-running application, and display time information obtained by the calculation on a screen.

According to an exemplary embodiment, the controller 150 may generate a power profile indicating power consumption of applications that have been run in the mobile device 100 based on data obtained by monitoring usage of the mobile device 100 for a predetermined time, and determine power consumption of the future application and power consumption of the at least one other application based on the generated power profile.

Figure 2B:
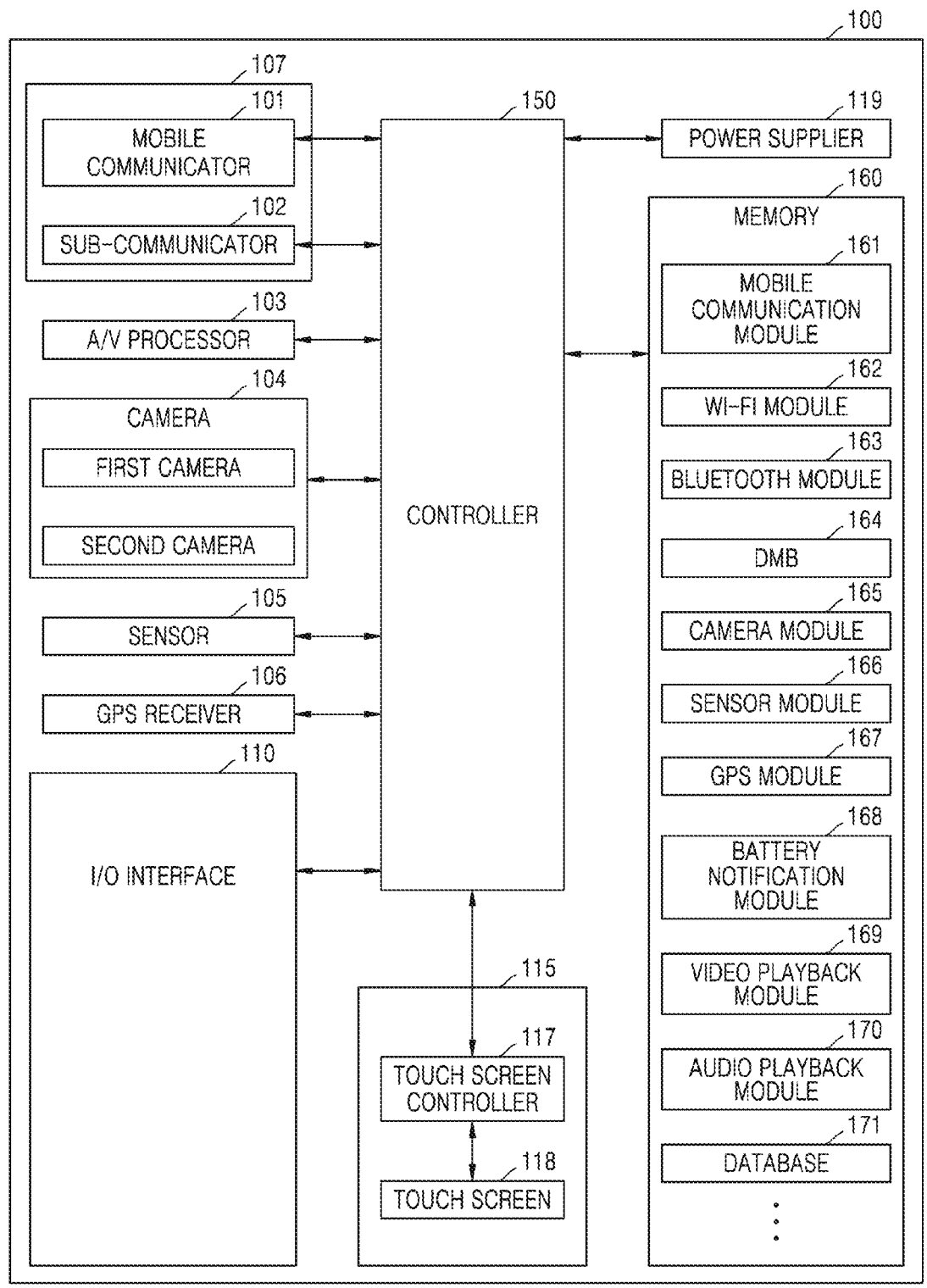
FIG. 2B is a detailed block diagram of the mobile device of FIG. 2A.

FIG. 2B is a detailed block diagram of the mobile device 100 of FIG. 2A.

FIG. 2B illustrates a structure of the mobile device 100 that provides a user with a battery power notification, according to an exemplary embodiment. The mobile device 100 may further include a USB port to which a USB connector may be connected, various external input ports for connecting with an external terminal such as a headset, a mouse, and a LAN, a digital multimedia broadcasting (DMB) chip that receives and processes DMB signals, and various sensors, according to an exemplary embodiment. In addition, according to exemplary embodiments, names of components in the mobile device 100 may vary, and some components may be omitted or additional components may be included.

The communicator 107 includes a mobile communicator 101 and a sub-communicator 102. The mobile communicator 101 performs a broadband network communication according to various communication standards such as ZigBee, 3G, 3$^{rd}$ Generation Partnership Project (3GPP), and LTE.

The sub-communicator 102 performs communication with a peripheral device by using short distance communication protocols such as Bluetooth, Wi-Fi, and NFC.

An audio/video (A/V) processor 103 may process content received from an external source, or audio data and video data in content stored in a memory 160. The A/V processor 103 may perform various image processing operations on video data, such as decoding, scaling, noise filtering, frame rate conversion, and resolution conversion. Also, the A/V processor 103 may perform various operations on audio data, such as decoding, amplifying, and noise filtering. When an application for reproducing multimedia content is run, the controller 150 may drive the A/V processor 103 and play the content. A speaker included in an input/output (I/O) interface 110 outputs audio signals received from the A/V processor 103.

A camera 104 includes lens and optical devices for capturing pictures or videos. Although two cameras are shown in FIG. 2B, one camera or three or more cameras may be included according to exemplary embodiments.

A sensor 105 may include a gravity sensor sensing motions of the mobile device 100, an illuminance sensor sensing brightness of light, a proximity sensor sensing proximity of a person, and a motion sensor sensing motions of a person.

A GPS receiver 106 receives GPS signals from satellites. Various services may be provided to the user by using the GPS signals.

The I/O interface 110 provides an interface for an external device or a person. The I/O interface 110 may include a button, a microphone, a speaker, a vibration motor, a connector, and a keypad.

According to an exemplary embodiment, the I/O interface 110 may output a notification sound informing battery insufficiency via the speaker.

According to an exemplary embodiment, the I/O interface 110 may output notification vibrations informing battery insufficiency via the vibration motor.

The display 115 includes a touch screen controller 117 and a touch screen 118.

The touch screen 118 receives a touch input of the user. The touch input is detected by various gestures such as pinching, spreading, dragging, and tapping. A display panel of the touch screen 118 may be a liquid crystal display (LCD), an organic light-emitting diode (OLED) display, an active-matrix OLED (AM-OLED), or a plasma display panel (PDP). Also, the display panel may be flexible, transparent, and/or wearable.

The touch screen controller 117 transmits, to the controller 150, the touch input that is received via the touch screen 118.

According to an exemplary embodiment, the display 115 may output a notification message that informs battery insufficiency or a battery indicator that informs a remaining battery life.

A power supplier 119 includes a battery for supplying power to the mobile device 100 or an interface for connecting the mobile device 100 with an external power source.

The memory 160 may store an operating system (OS), various programs (applications), and data for operating the mobile device 100. The memory 160 may include at least one of an internal memory and an external memory.

The internal memory may include at least one of the internal memory, for example a volatile memory (e.g., dynamic RAM (RAM), static RAM (SRAM), and synchronous dynamic RAM (SDRAM)), a non-volatile memory (e.g., one-time programmable ROM (OTPROM), programmable ROM (PROM), erasable and programmable ROM (EPROM), electrically erasable and programmable ROM (EEPROM), mask ROM, an flash ROM), a hard disk drive (HDD), and a solid state drive (SSD). The controller 150 may load, in the volatile memory, an instruction or data that is received from the non-volatile memory or at least one other component and process the loaded instruction or data. Also, the controller 150 may store, in the non-volatile memory, data generated or received from another component. An external memory may include at least one of, for example, CompactFlash (CF), Secure Digital (SD), micro SD, mini SD, extreme digital (xD), and Memory Stick.

Programs (applications) stored in the memory 160 may be classified into a plurality of modules according to functions, for example, a mobile communication module 161, a Wi-Fi module 162, a Bluetooth module 163, a DMB module 164, a camera module 165, a sensor module 166, a GPS module 167, a battery notification module 168, a video playback module 169, and an audio playback module 170.

Each module includes instructions for performing various functions provided by the mobile device 100. Because functions of the modules may be intuitively understood by one of ordinary skill in the art from the respective names of the modules, only the battery notification module 168, which provides a battery power notification to the user according to an exemplary embodiment, will be described herein.

According to an exemplary embodiment, the battery notification module 168 includes instructions to determine a future application to be run by the mobile device 100 within a predetermined time, to determine whether a current remaining battery life is enough to run the future application based on power consumption of a currently-used application or an application to be run before the future application, and to output notifications informing battery insufficiency. The instructions are run by the controller 150, and then, a battery notification may be provided to the user via the I/O interface 110 or the display 115 as text, an image, sound, vibration, or light. Furthermore, the battery notification module 168 may further include additional instructions that allow the mobile device 100 to perform operations that correspond to the aforementioned exemplary embodiments. For example, instructions that monitor usage of the mobile device 100 for a predetermined time, and machine learning algorithms for learning usage patterns of the user with respect to the mobile device 100 may be included in the battery notification module 168.

According to an exemplary embodiment, the memory 160 may include a database 171 that stores usage data. The database 171 may store usage data 411 related to application usage, a power profile 420, and an application execution schedule 430. This will be described with reference to FIGS. 4A and 4B.

The controller 150 may control units shown in FIG. 2A and provide various services to the user by running the programs (applications) stored in the memory 160. The controller 150 may include at least one of RAM, ROM, and a CPU. RAM, ROM, a CPU, and a GPU may be connected to each other via a bus. The CPU may access the memory 160 and perform booting operations by using an OS stored in the memory 160. Also, various functions may be performed by using programs, content, and data stored in the memory 160. The ROM stores an instruction set for system booting. For example, when power is supplied to the mobile device 100, the CPU copies an OS stored in the memory 160 to the RAM according to an instruction stored in the ROM, runs the OS, and performs system booting operations. When the booting operations are finished, the CPU copies the programs stored in the memory 160 to the RAM, and performs various operations by running the programs copied to the RAM.

The aforementioned exemplary embodiments may be applied to any integrated circuit including a signal processor configured to perform any of the aforementioned operations. Furthermore, the exemplary embodiments may be applied to any wireless communication interface. Also, for example, the exemplary embodiments may be employed in a design of a stand-alone device, such as a signal processor, an application-specific integrated circuit (ASIC), or microcontroller, and/or any other sub-system element.

Figure 2C:
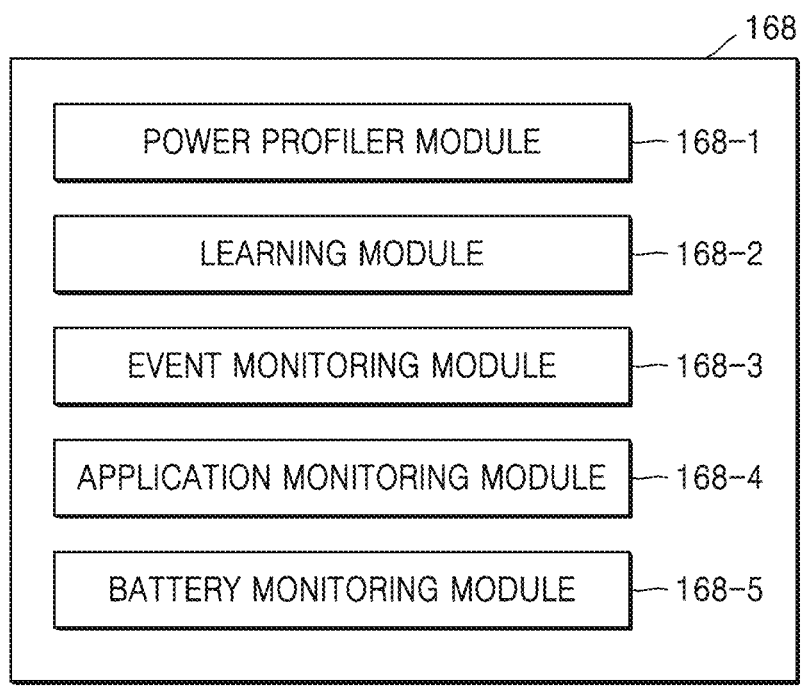
FIG. 2C is a detailed block diagram of a battery notification module of FIG. 2B.

FIG. 2C is a detailed block diagram of the battery notification module 168 of FIG. 2B.

Referring to FIG. 2C, the battery notification module 168 includes a power profiler module 168-1, a learning module 168-2, an event monitoring module 168-3, an application monitoring module 168-4, and a battery monitoring module 168-5.

The power profiler module 168-1 analyzes usage statistics based on application usage data, and accordingly, generates and manages power profiles for each application and each activity.

The learning module 168-2 determines usage patterns of a user which includes runtime of applications accessed by the user.

The event monitoring module 168-3 monitors events related to the user.

The application monitoring module 168-4 monitors applications that are accessed or used by the user.

The battery monitoring module 168-5 monitors a current battery level of the mobile device 100.

Figure 3:
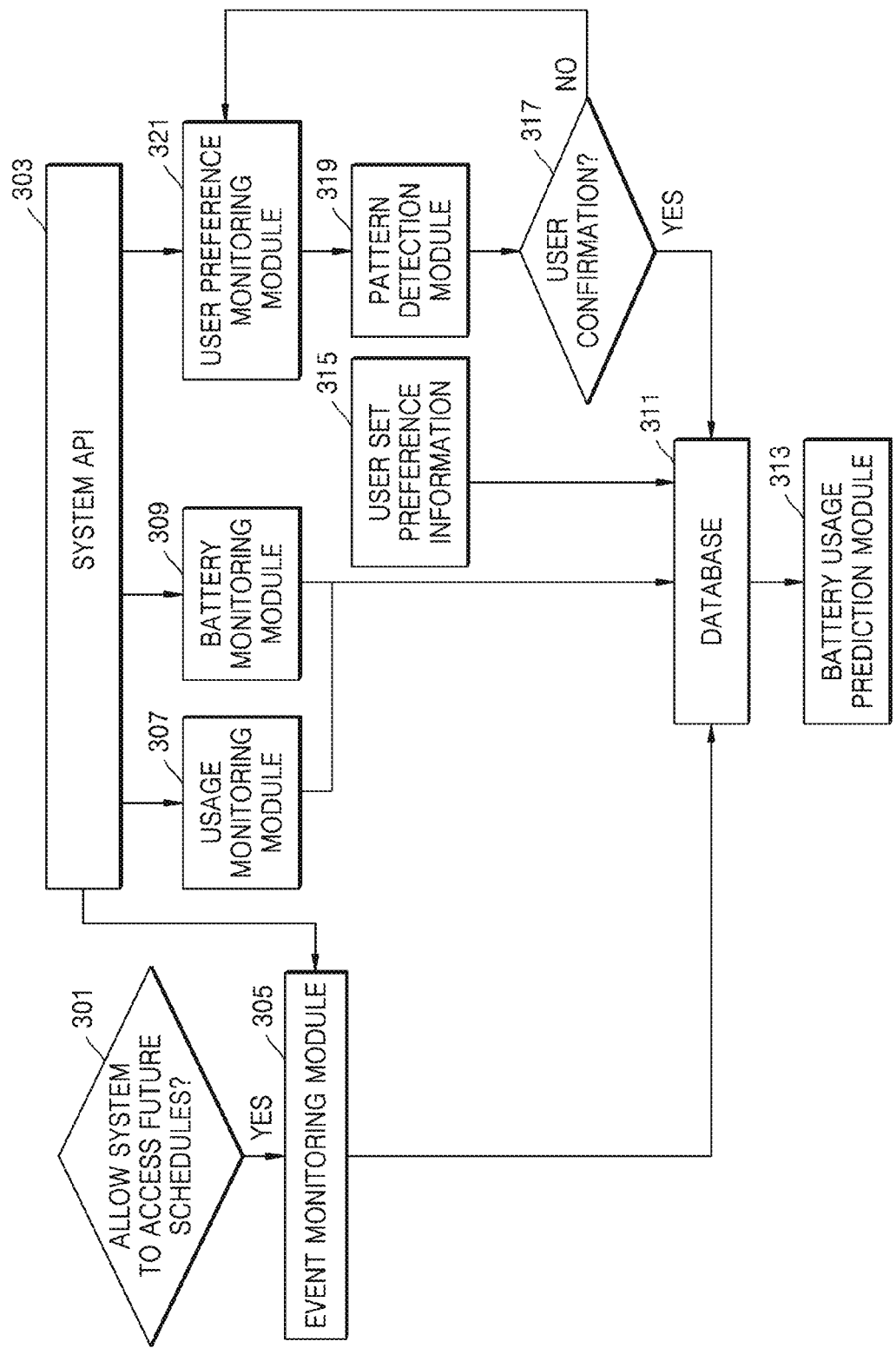
FIG. 3 is a flowchart of part of an operation performed by the mobile device of FIG. 2B.

FIG. 3 is a flowchart of part of an operation performed by the mobile device 100 of FIG. 2B.

A system application programming interface (API) 303 of the mobile device 100 may output information related to usage of the mobile device 100 to a usage monitoring module 307, a battery monitoring module 309, and a user preference monitoring module 321. The monitoring modules 307, 309, and 321 may perform continuous monitoring. Also, the system API 303 may output information related to future events to the event monitoring module 305, which may be operated to process future schedules. The event monitoring module 305 may use a permission 301 of the user to access the future schedules.

The usage monitoring module 307 and the battery monitoring module 309 may output gathered information to a database 311 that may be included in the mobile device 100 or located in a remote device.

The user preference monitoring module 321 may output information about past and current usage of the user to a pattern detection module 319. When the user confirms that the information may be utilized at 317, the information collected by the pattern detection module 319 may be output to the database 311.

User set preference information 315 may be additionally input to the database 311 so that the database 311 may output relevant information to a battery usage prediction module 313.

The battery usage prediction module 313 may predict a battery level based on at least one of future schedules, past or current usage, and a current battery level.

Figure 4A:
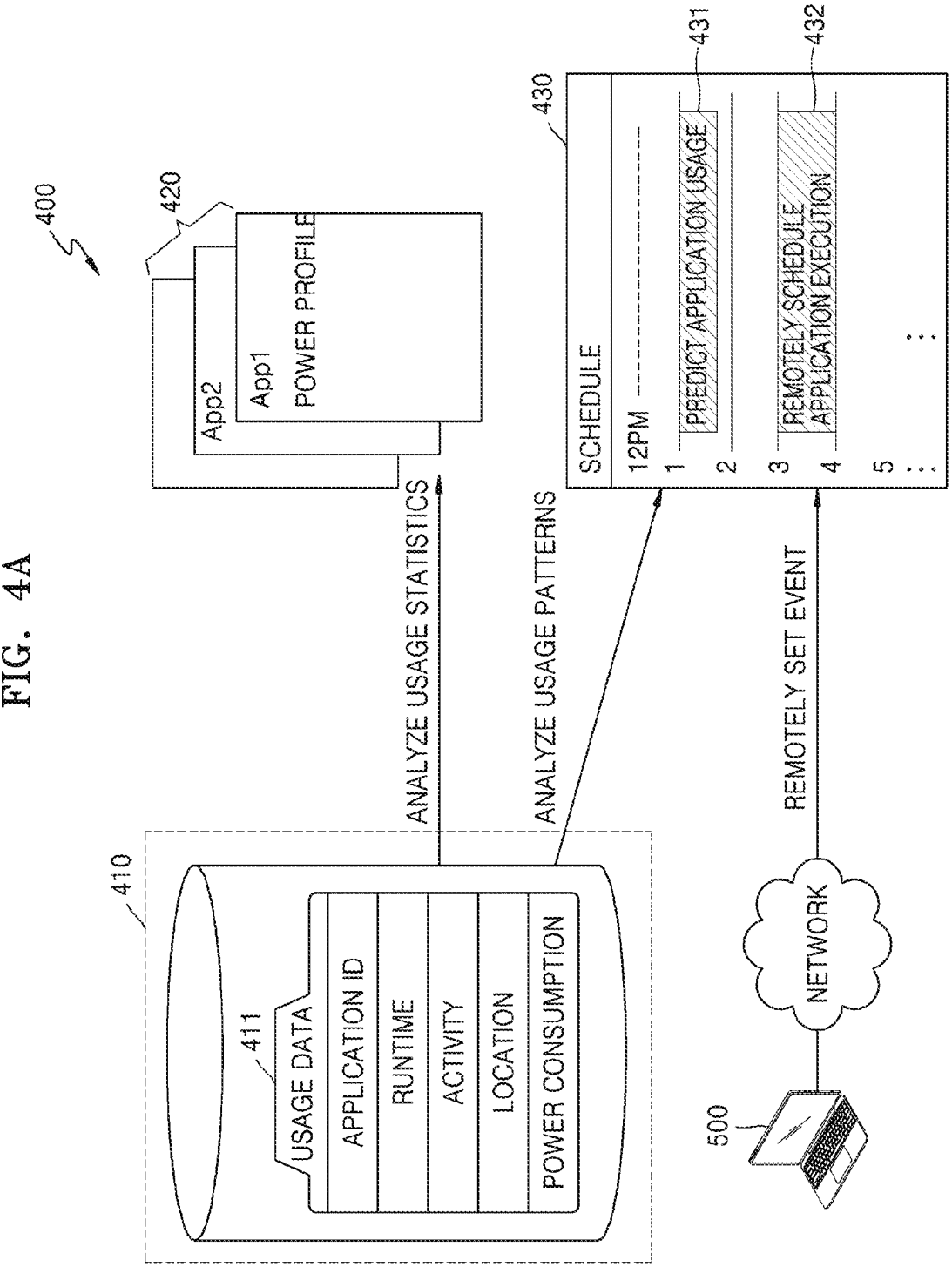
FIG. 4A is a diagram of a usage data database, according to an exemplary embodiment.

FIG. 4A is a diagram of a usage data database, according to an exemplary embodiment.

The mobile device 100 collects usage data by monitoring user usage of the mobile device 100. For example, a database 410 stores the usage data 411 that includes an ID, runtime, and an execution location of an application accessed by the user, an activity/event related to the execution of the application, and power consumption. The database 410 does not necessarily have to be located in the mobile device 100. The database 410 may be included in the online server 150.

The mobile device 100 or the external server 150 may analyze usage statistics based on the usage data 411 stored in the database 410, and accordingly, generates the power profile 420 that shows power and/or energy consumed by applications. The power profile 420 is not limited to a data structure or format, and may be shown in any format as long as power and/or energy consumed by an application or an activity may be shown. For example, a power profile of an X application may include information indicating that the X application consumes an average power of Y mA and/or information indicating that the X application consumes energy of Z mAh.

According to an exemplary embodiment, the mobile device 100 may analyze usage patterns of the user based on the usage data 411 collected by monitoring usage of the mobile device 100, and thus, generate the application execution schedule 430 by predicting a schedule of the user, when the user runs which application (431). For this, the mobile device 100 may use an appropriate learning algorithm based on machine learning. Machine learning is a technical field in which a computer is trained based on previously historical data and thus recognizes a pattern. A learning algorithm is not specifically limited. For example, when a usage pattern of a user running an X game application by using his or her smartphone for 30 minutes between 1 p.m. to 2 p.m. every Monday is detected, the smartphone predicts that the user will also run the X application for 30 minutes at a similar time next Monday, and thus outputs an appropriate battery alarm with reference to a power profile of the X application.

The application execution schedule 430 may be forcibly set by the remote device 500 in some cases. For example, when a user is a patient, a medical doctor may schedule a health care application to be run in a mobile phone of the patient at a time (432) by using a remote control system in a hospital. For this, verification of the remote device 500 has to be performed in advance. Because the health care application has to be run at a set time, a notification for warning battery insufficiency in advance may be used.

According to an exemplary embodiment, with regard to the power profile 420 and the application execution schedule 430 of the user, the mobile device 100 may determine an application to be run by the user within a predetermined time (e.g., within six hours from now, or within today) (hereinafter, referred to as 'future application'). Also, when it is determined that running or closing of the future application is impossible at a current battery level, the mobile device 100 may output a battery notification warning battery insufficiency. The battery notification is an inclusive meaning that includes all types of warning messages related to a remaining battery capacity, and may be displayed in various manners, such as a message displayed on a screen, light, sounds, or vibrations.

According to an exemplary embodiment, the mobile device 100 may not only output a battery notification related to the mobile device 100 itself, but also a battery notification related to the peripheral device 600 that is paired with an application. For example, when execution of a health care application for scanning a heart rate of the user by using a wearable device, e.g., the peripheral device 600, is scheduled, the mobile device 100 may receive battery information of the wearable device in advance. With reference to the power profile 420, when it is determined that battery power will be insufficient to scan the heart rate by the wearable device at the scheduled time, a battery notification related to the wearable device is output.

Figure 4B:
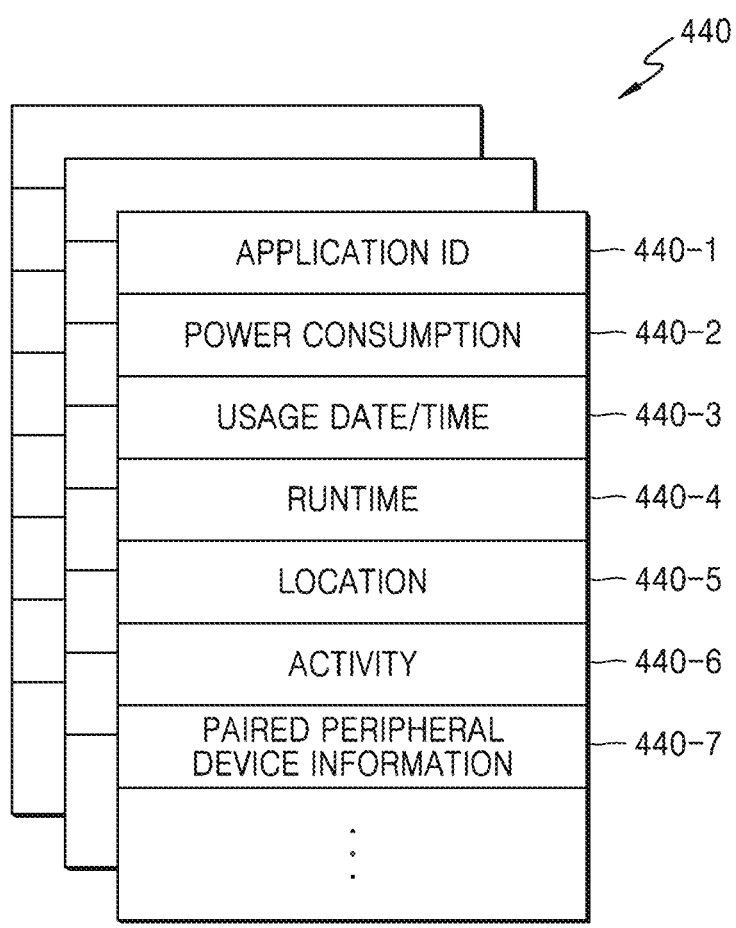
FIG. 4B is a diagram of a power profile, according to an exemplary embodiment.

FIG. 4B is a diagram of a power profile 440, according to an exemplary embodiment.

According to an exemplary embodiment, the power profile 440 may include a table in which an application access history of the user is recorded with power consumption or energy of the application.

Entries of the power profile 440 respectively correspond to applications.

Referring to FIG. 4B, each entry of the power profile 440 includes an application ID 440-1 that indicates an ID of an application, power consumption or energy 440-2 of the application, usage date/time 440-3 of the application, runtime 440-4 of the application, a location 440-5 where the application has been run, a relevant activity 440-6 of the application, and paired peripheral device information 440-7. The paired peripheral device information 440-7 may include information of the peripheral device, such as an ID of the peripheral device and power consumption of the peripheral device.

Figure 4C:
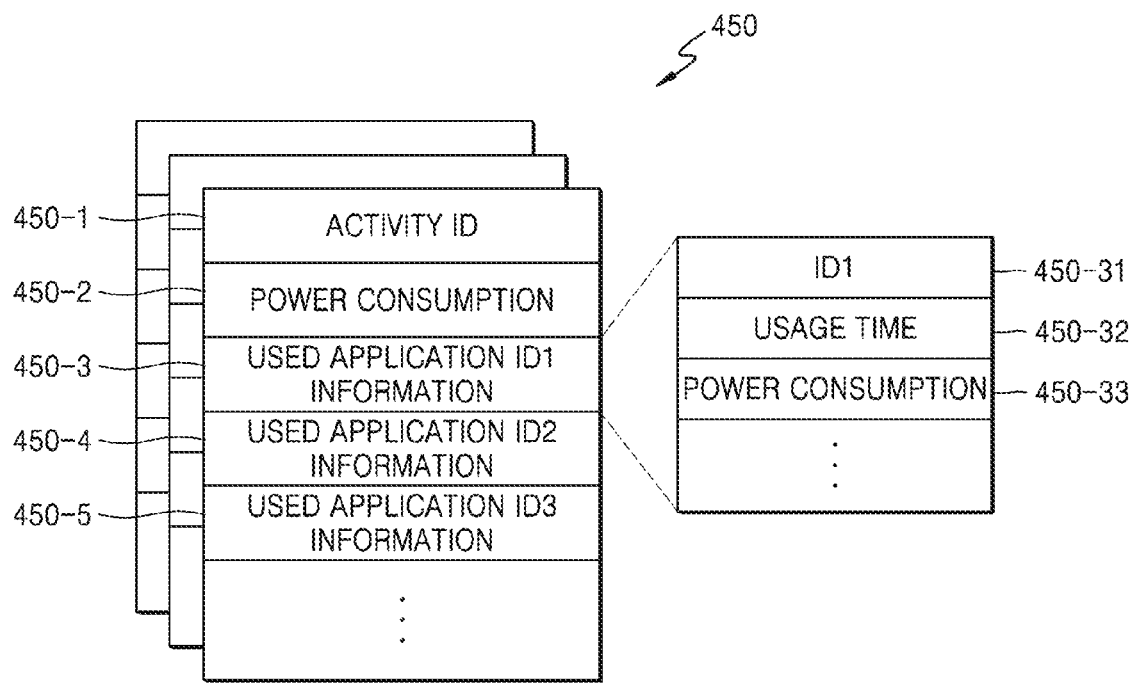
FIG. 4C is a diagram of a power profile, according to another exemplary embodiment.

FIG. 4C is a diagram of a power profile 450, according to another exemplary embodiment.

Although FIG. 4B illustrates an example in which the power profile 440 is generated for each application, the power profile 450 may be generated for each activity (event). An event comprises at least one application which is used in performing the event.

Referring to FIG. 4C, each entry of the power profile 450 may include an activity ID 450-1 that indicates an ID of an activity, power consumption 450-2 of the activity, application ID1 information 450-3 that is used for the activity, application ID2 information 450-4 that is used for the activity, and application ID3 information 450-5 that is used for the activity. For example, the application ID1 information 450-3 may include application ID1 450-31, usage time 450-32, and power consumption 450-33.

For example, a power profile of a "mountain climbing" activity may include information indicating that the "mountain climbing" activity of the user consumes an average power of K mA and/or information indicating that the "mountain climbing" activity consumes energy of L mAh. Furthermore, information such as ID, usage time, and power consumption of an application used by the user during the "mountain climbing" activity may be included. With reference to the power profile, it is possible to predict energy for schedules stored in a calendar or a to-do list of the user. For example, when the user has stored a schedule "12:00 mountain climbing," a mobile device may determine that energy of L mAh has to be saved before 12:00, with reference to a power profile related to the "mountain climbing" activity. Alternatively, when the user has stored a schedule "12:00~15:00 mountain climbing" in a calendar, a mobile device may determine that energy of 3K mAh has to be saved before 12:00 for the mountain climbing schedule of the user, with reference to a power profile related to the "mountain climbing" activity.

As another example, it is possible predict energy for a "mountain climbing" activity that is scheduled in the near future by analyzing usage data related to the "mountain climbing" activity, analyzing a power profile related to "mountain climbing" activity, or referring to a power profile of an application used for the "mountain climbing" activity.

Figure 5:
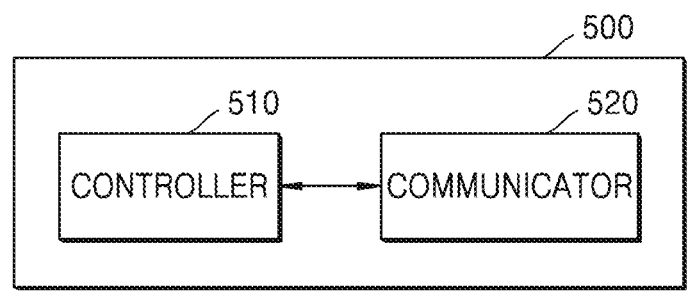
FIG. 5 is a block diagram of a remote device, according to an exemplary embodiment.

FIG. 5 is a block diagram of the remote device 500, according to an exemplary embodiment.

Referring to FIG. 5, the remote device 500, which may remotely control the mobile device 100, includes a controller 510 and a communicator 520.

The communicator 520 allows the remote device 500 to communicate with an external device via the network 50.

The controller 510 controls overall operations of the remote device 500, and controls the mobile device 100 by using the communicator 520.

The controller 510 may include a RAM that is used as a storage area for storing signals or data input from an external source of the remote device 500 or a storage area corresponding to various operations performed by the remote device 500, a ROM that stores a control program for controlling the remote device 500, and a processor. The processor may be implemented as a SoC that integrates a core and a GPU. Also, the processor may include a plurality of processors.

According to an exemplary embodiment, the controller 510 may transmit an application execution request to the mobile device 100.

According to an exemplary embodiment, the controller 510 may transmit, to the mobile device 100, an instruction to close at least one other application in the mobile device 100 to run the application that is requested to be run.

Figure 6:
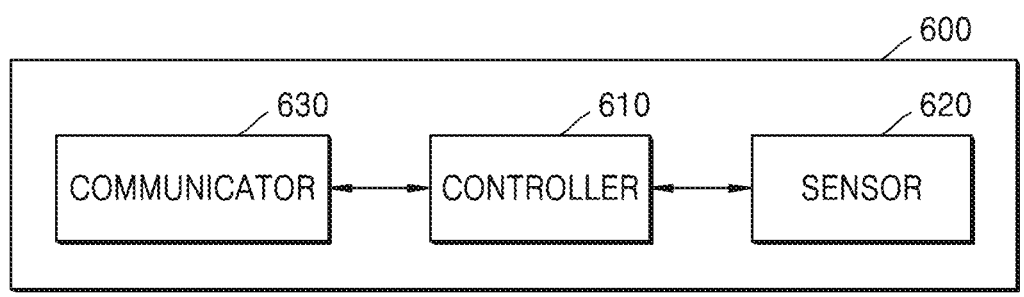
FIG. 6 is a block diagram of a peripheral device, according to an exemplary embodiment.

FIG. 6 is a block diagram of the peripheral device 600, according to an exemplary embodiment.

Referring to FIG. 6, the peripheral device 600, which may be paired to the mobile device 100 and perform a predetermined function, may include a controller 610, a sensor 620, and a communicator 630.

The communicator 630 allows the peripheral device 600 to communicate with the mobile device 100 via a network.

The sensor 620 includes at least one sensor and detects status of a user using the peripheral device 600 or usage environment status. The sensor 620 may measure a physical quantity or detect an operation status of the peripheral device 600, and convert measured or detected information into electric signals. The sensor 620 may include at least one of, for example, a gesture sensor, a gyro sensor, an air pressure sensor, a magnetic sensor, an acceleration sensor, a grip sensor, a proximity sensor, a color sensor, a body sensor, a temperature/humidity sensor, an illuminance sensor, and a ultraviolet (UV) sensor. Additionally or alternatively, the sensor 620 may include, for example, an olfactory sensor (E-nose sensor), an electromyography (EMG) sensor, electroencephalogram (EEG) sensor, an electrocardiogram (ECG) sensor, an infrared (IR) sensor, an iris sensor, or a fingerprint sensor. The sensor 620 may further include a control circuit for controlling at least one sensor included in the sensor 620.

The controller 610 controls overall operations of the peripheral device 600, including the sensor 620 and the communicator 630.

The controller 610 may include a RAM that is used as a storage area for storing signals or data that is input from an external source of the peripheral device 600 or as a storage area corresponding to various operations performed by the peripheral device 600, a ROM that stores a control program for controlling the peripheral device 600, and a processor. The processor may be implemented as a SoC that integrates a core and a GPU. Also, the processor may include a plurality of processors.

According to an exemplary embodiment, the controller 610 may periodically transmit a remaining battery life of the peripheral device 600 to the mobile device 100.

According to an exemplary embodiment, the controller 610 may transmit the remaining battery life of the peripheral device 600 in response to a request of the mobile device 100.

Figure 7:
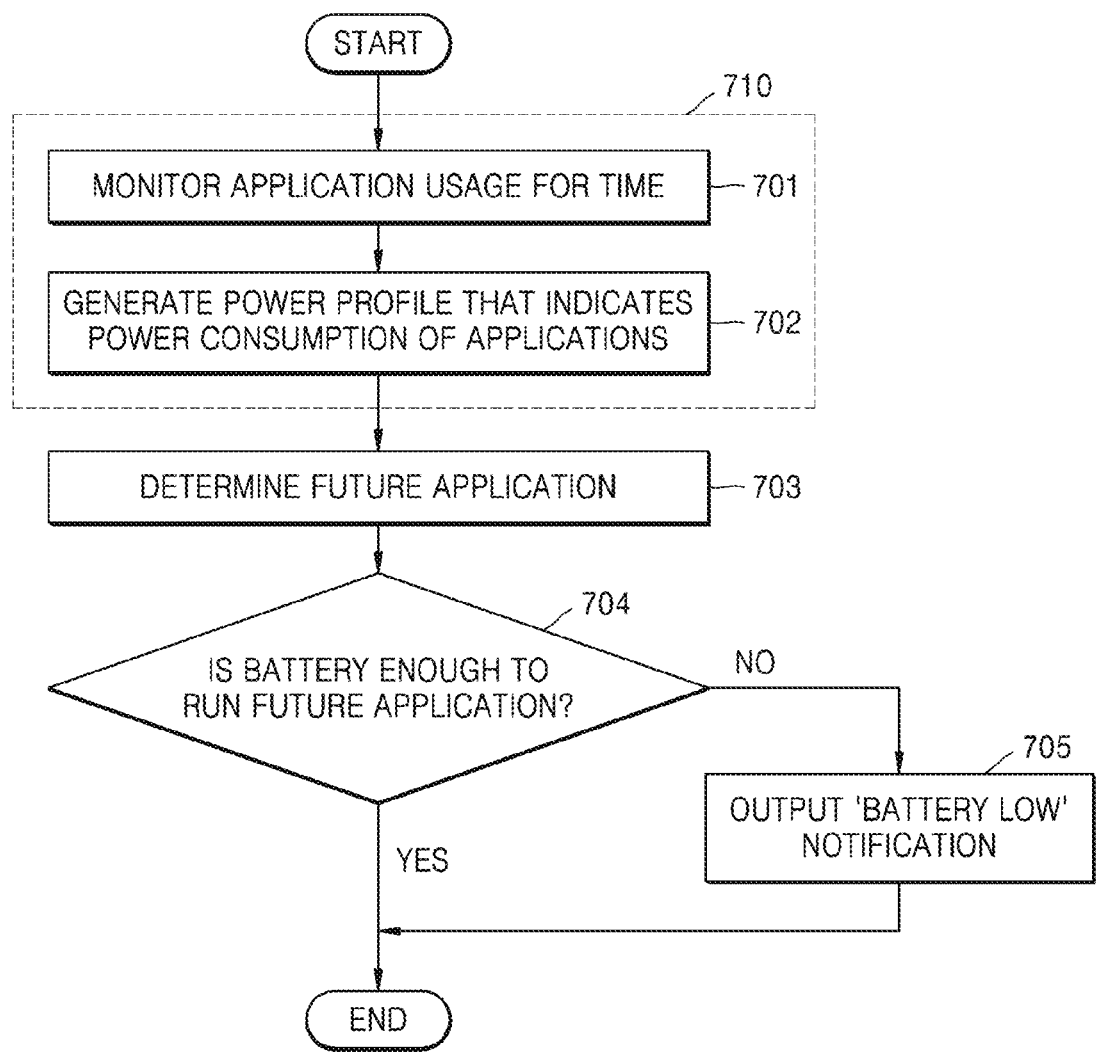
FIG. 7 is a flowchart of processes of providing a user with a battery power notification in a mobile device, according to an exemplary embodiment.

FIG. 7 is a flowchart of processes of providing a user with a battery notification in the mobile device 100, according to an exemplary embodiment.

In operation 701, the mobile device 100 monitors usage of an application for a time. The mobile device 100 may be designed such that monitoring time may be set by a user. During this time, data of the application, for example, runtime, date, time, a location, a type of the application, an activity, power consumption, and paired peripheral device information may be stored in a memory.

According to an exemplary embodiment, the controller 150 of the mobile device 100 may monitor usage data according to operations shown in FIG. 3.

In operation 702, the mobile device 100 generates a power profile that indicates power consumption (or energy) of applications, based on collected data.

According to an exemplary embodiment, the controller 150 of the mobile device 100 may generate a power profile for each application or each activity based on collected usage data, as shown in FIGS. 4A and 4B.

Operation 710 that includes operations 701 and 702 may be periodically performed according to inner settings of the mobile device 100 and user settings.

In operation 703, the mobile device 100 determines a future application to be run in the mobile device 100 within a predetermined time.

According to an exemplary embodiment, the future application may be determined based on various schedule management applications of the user, such as a calendar or a to-do list.

According to an exemplary embodiment, a mobile device may determine a future application by predicting a schedule that is not input to a schedule management application based on a machine learning algorithm.

According to an exemplary embodiment, a mobile device may determine a future event or a future application according to importance levels of a plurality of applications or events.

According to an exemplary embodiment, a mobile device may determine a future application based on usage patterns of the mobile device.

According to an exemplary embodiment, a mobile device may determine an application that is used by a peripheral device as a future application According to an exemplary embodiment, a mobile device may determine a future application according to an input received from a remote device.

In operation 704, the mobile device 100 determines whether a current remaining battery life is enough to run the future application based on power consumption of an application to be performed before the future application (hereinafter, 'preceding application') or power consumption of a currently-running application. For this, power profiles of the currently-running application and the preceding application may be referenced. Like the future application, the preceding application may be determined by using the schedule management application of the user or the machine learning algorithm. When the mobile device 100 determines that the current remaining battery life is insufficient to run the future application, the mobile device 100 continues in operation 705.

In operation 705, the mobile device 100 outputs a 'battery low' notification. The 'battery low' notification may be output by various components of the mobile device 100. According to an exemplary embodiment, the mobile device 100 may output the 'battery low' notification by using the vibration motor or the speaker in the I/O interface 110 or the display 115.

Figure 8:
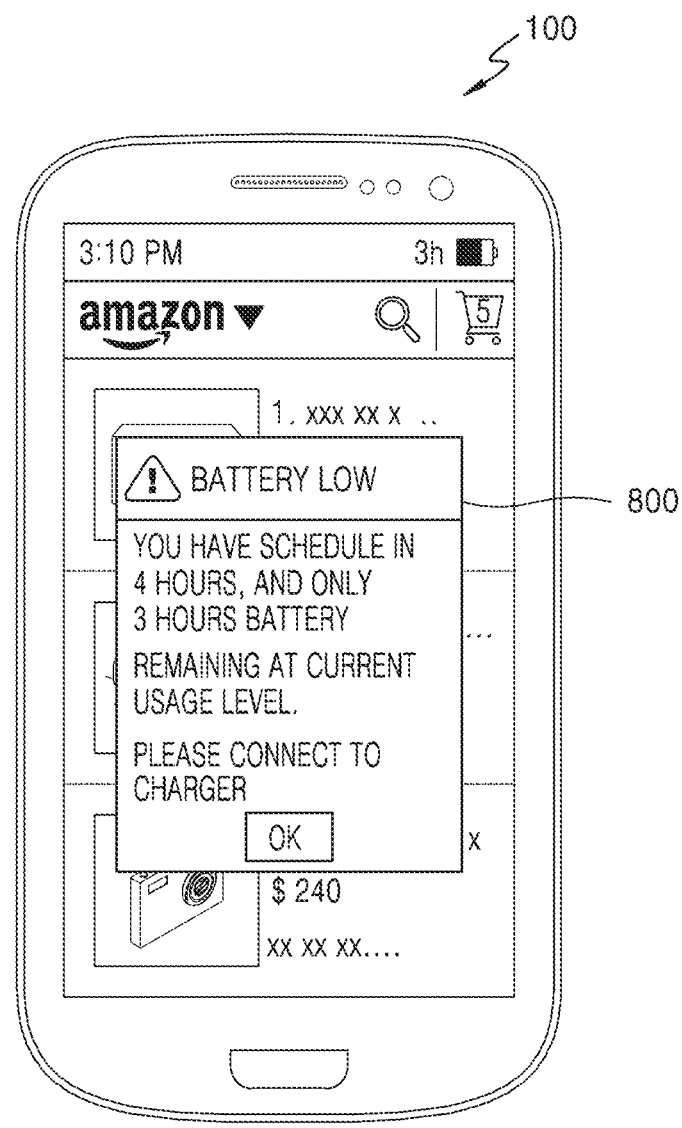
FIG. 8 is a diagram of a 'battery low' notification message that is displayed on a mobile device, according to an exemplary embodiment.

FIG. 8 is a diagram of a 'battery low' notification message that is displayed on the mobile device 100, according to an exemplary embodiment.

Referring to FIG. 8, the mobile device 100 displays a 'battery low' notification message, for example, a message 800 "You have schedule in 4 hours, and only 3 hours battery remaining at current usage level. Please connect to charger" on a display. The message 800 shown in FIG. 8 is only an example, and any form of message that may inform battery insufficiency may be provided.

According to an exemplary embodiment, the mobile device 100 may determine a future event according to importance levels of events.

Figure 9:
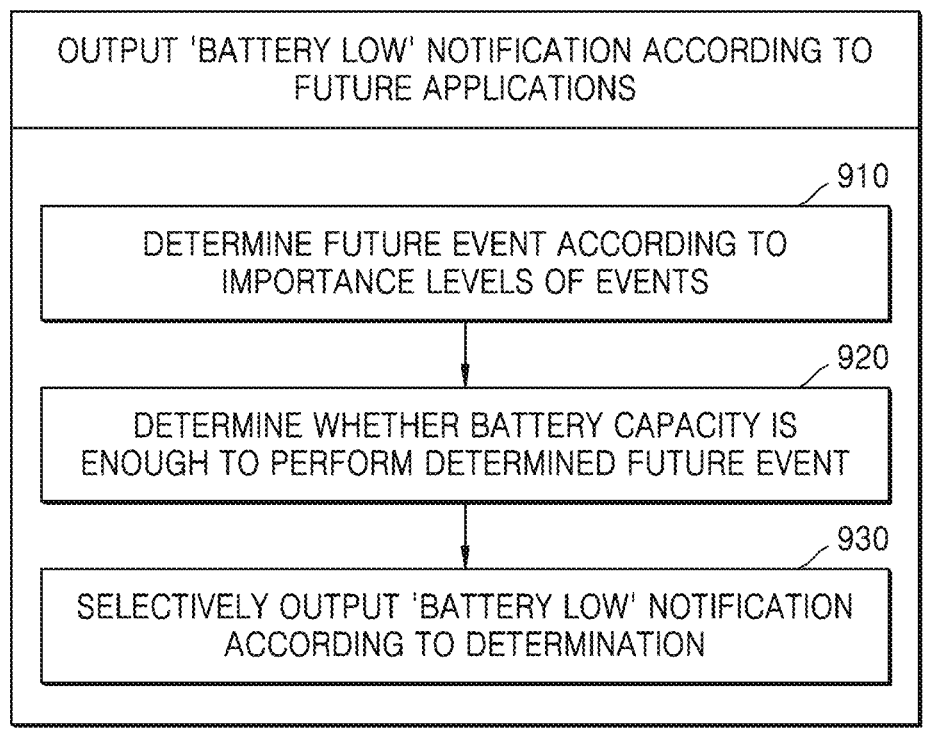
FIG. 9 is a flowchart of operations of outputting a 'battery low' notification according to future applications, according to an exemplary embodiment.

FIG. 9 is a flowchart of operations of outputting a 'battery low' notification according to future applications, according to an exemplary embodiment.

In operation 910, the mobile device 100 determines a future event according to importance levels of events.

It may be convenient to classify future events that are scheduled for a user according to importance levels of the future events. For example, a heart rate scan event may be more important than a conference call. Therefore, when displaying the future events, the mobile device 100 may display an action and an importance level related to each event. An importance level of an application may be highlighted over other applications by using a font, font size, color, audio tone, or warning sound.

An importance level of a user scheduled event may be set by the user or set by the event itself. For example, a third party, e.g., a medical service provider, may re-set or control an importance level of a user scheduled event by using the remote device 500.

The importance level may be a learned parameter obtained by using a crowd learning technology in which usage information and importance levels set by many users are collected and analyzed.

The importance level may be facilitated by using an importance matrix, and the importance matrix may be located within the mobile device 100. The importance matrix may include an array of various applications assigned with an importance level. The importance level may be set by the user or remotely set via the remote device 500, for example, remotely set from a server.

The user may set importance levels of his or her user scheduled events.

In some examples relating to a patient care application, a health care provider may remotely change an importance level of at least one related scheduled event. Accordingly, when the change is indicated on a user interface of the mobile device 100, the user may be aware of the change in the importance level of the patient care application, and an early warning may be provided by the mobile device 100.

In operation 920, the mobile device 100 determines whether battery capacity is enough to perform the determined future event.

According to an exemplary embodiment, the controller 150 of the mobile device 100 may determine whether battery capacity is enough to perform the determined future event with reference to the power profile shown in FIG. 4B or 4C and a current battery level of the mobile device 100.

In operation 930, the mobile device 100 selectively outputs the 'battery low' notification according to the determination of operation 920.

Figure 10A:
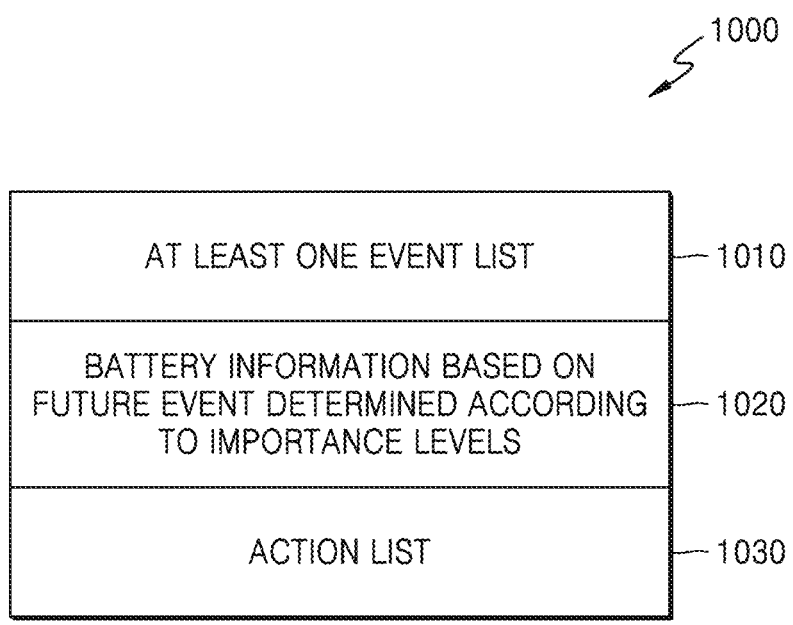
FIG. 10A is a diagram of a 'battery low' notification message that is displayed on a mobile device according to importance levels of events, according to an exemplary embodiment.

FIG. 10A is a diagram of a 'battery low' notification message that is displayed on the mobile device 100 according to importance levels of events, according to an exemplary embodiment.

Referring to FIG. 10A, a message 1000 may include at least one event list 1010, battery information 1020 based on a future event determined according to importance levels, and an action list 1030.

The at least one event list 1010 is a list of at least one event to be performed in the mobile device 100.

The battery information 1020 is information about whether battery capacity is enough to perform the future event that is determined according to the importance levels.

The action list 1030 is a list of at least one action that may be performed to save sufficient battery power for performing the future event when the battery power is insufficient to perform the future event that is determined according to the importance levels. For example, an action may include connecting a charger and charging, or stopping a currently-running application or an application to be run in the future, i.e., an application that is run before a future application to save battery.

Figure 10B:
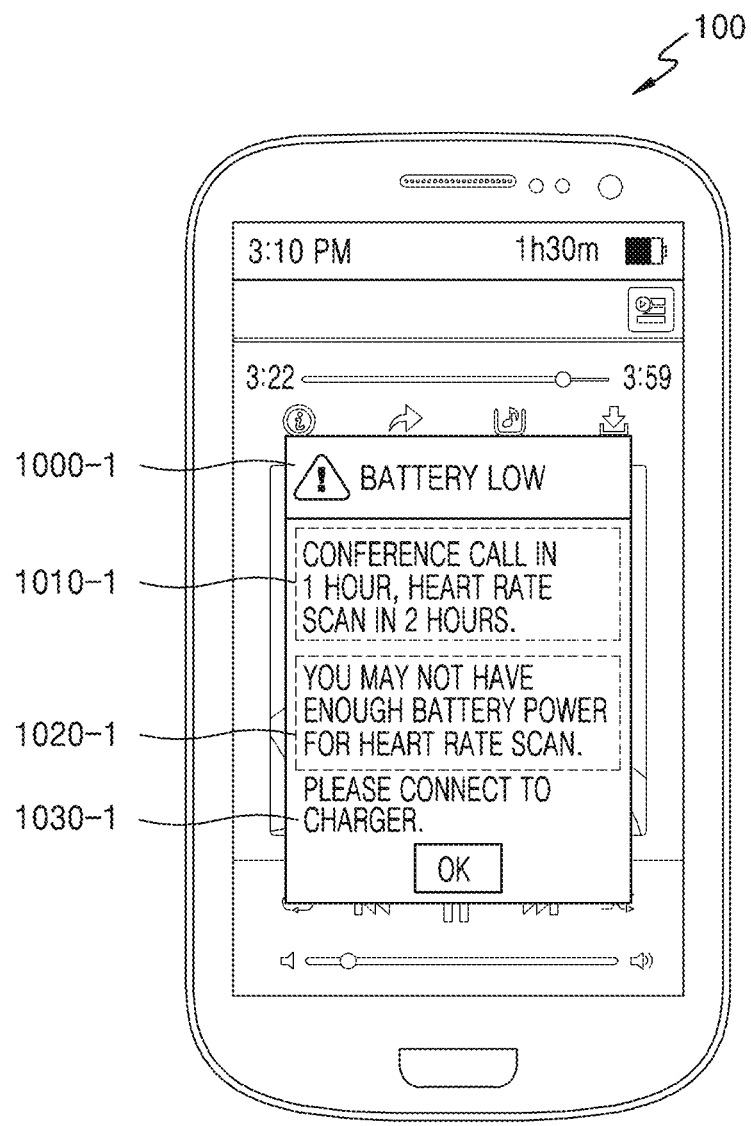
FIG. 10B is a diagram of a screen of a mobile device that provides battery power notifications based on events of a user, according to an exemplary embodiment.

FIG. 10B is a diagram of a screen of the mobile device 100 that provides battery power notifications based on events of a user, according to an exemplary embodiment.

Referring to FIG. 10B, via a user interface, the mobile device 100 may notify a user, by using, for example, a pop up window 1000-1, at least one future event "conference call in 1 hour, heart rate scan in 2 hours" 1010-1, battery information based on a future event "You may not have enough battery power for heart rate scan" 1020-1, and an action list "Please connect to a charger" 1030-1. An importance level of an event may be highlighted to the user by using various methods by the controller 150. For example, the controller 150 may utilize a vibration function of the mobile device 100, utilize at least one notification light, initiate an audible notification, and utilize text to speech (TTS) software to notify the user about the importance of the event.

According to an exemplary embodiment, the importance level of "heart rate scan" may be highlighted to the user via a color, font, size, and/or thickness of the text.

According to an exemplary embodiment, the mobile device 100 may determine a future event according to a usage pattern of the mobile device 100.

Figure 11:
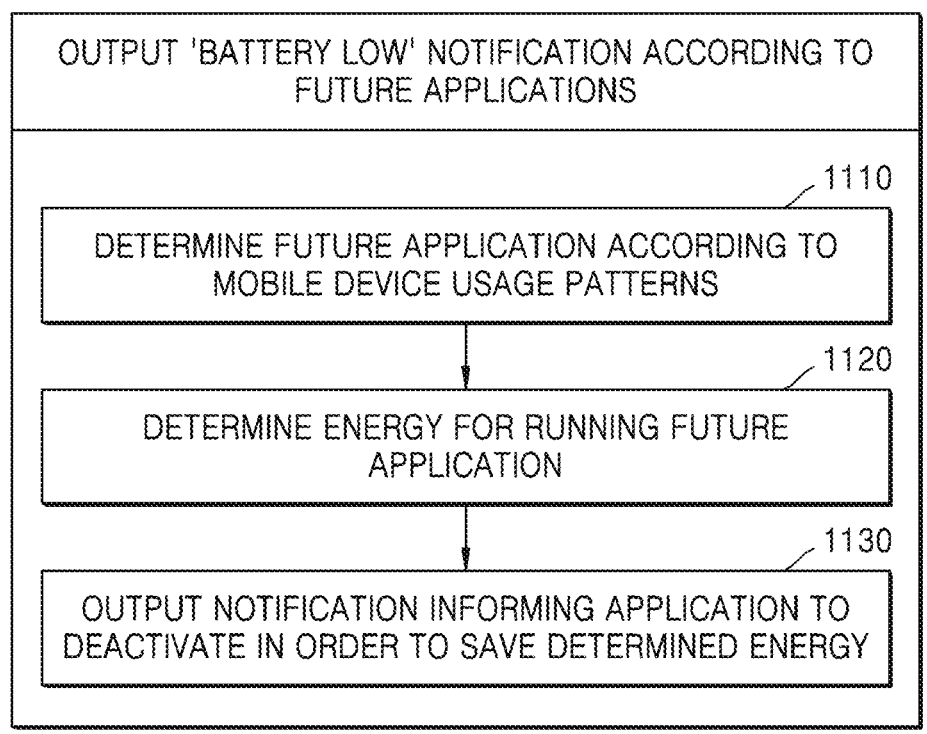
FIG. 11 is a flowchart of operations of outputting a 'battery low' notification according to future applications, according to an exemplary embodiment.

FIG. 11 is a flowchart of operations of outputting a 'battery low' notification according to future applications, according to an exemplary embodiment.

In operation 1110, the mobile device 100 determines a future application according to usage patterns of the mobile device 100.

According to an exemplary embodiment, the mobile device 100 may determine a future application according to the usage pattern of the mobile device 100 even when the future application is not intentionally set by a user. For example, based on an analysis of the usage pattern of the mobile device 100 of the user, when it is determined that the user has a habit of using a music player application to listen to music between 4 p.m. to 5 p.m., the mobile device 100 may determine the music player application as the future application.

In operation 1120, the mobile device 100 determines energy for running the determined future application.

The controller 150 of the mobile device 100 may use information from the power profiler module 168-1, the application monitoring module 168-4, the learning module 168-2, and the battery monitoring module 168-5 and make an intelligent determination of battery consumption according to an operation of each application. Furthermore, the controller 150 may collectively determine a battery life for multiple different applications, depending on user habits in the past. Therefore, the controller 150 may make the intelligent determination of which application to close to provide a battery consumption target amount A target battery level may refer to a battery level to run at least one important future scheduled application, but which currently may not be run based on current battery level and usage manner of a user.

The intelligent determination may not be based on linear interpretation of power distribution, as this may lead to an inaccurate result due to battery degradation. Therefore, regular checks of and updates for running applications are implemented to solve problems with battery performance degradation.

The intelligent determination may be based on each application or collectively on multiple different applications running simultaneously, which may be based on user habits. Therefore, the learning module 168-2 may assist the controller 150 to make an intelligent determination of power dissipation per current application and any informed recommendations to close at least one application in response thereto.

According to an exemplary embodiment, a battery power usage is determined on a per application basis. When this determination is coupled to an intelligent algorithm, it is able to provide a user with an ability to control the remaining battery life/time left in a wireless communication device by disabling at least one application and thereby determining, in a real-time manner, the likely or potential increase in estimated battery life. In this manner, a more intelligence based approach is taken than the related art that determines a remaining battery life based on current usage, which only changes once an application is disabled and does not provide an insight into the potential increase to battery power life.

In operation 1130, the mobile device 100 outputs a notification informing an application to deactivate in order to save the determined energy. According to another exemplary embodiment, the mobile device 100 may output a notification of recommending charging the battery to save the determined energy.

Figure 12:
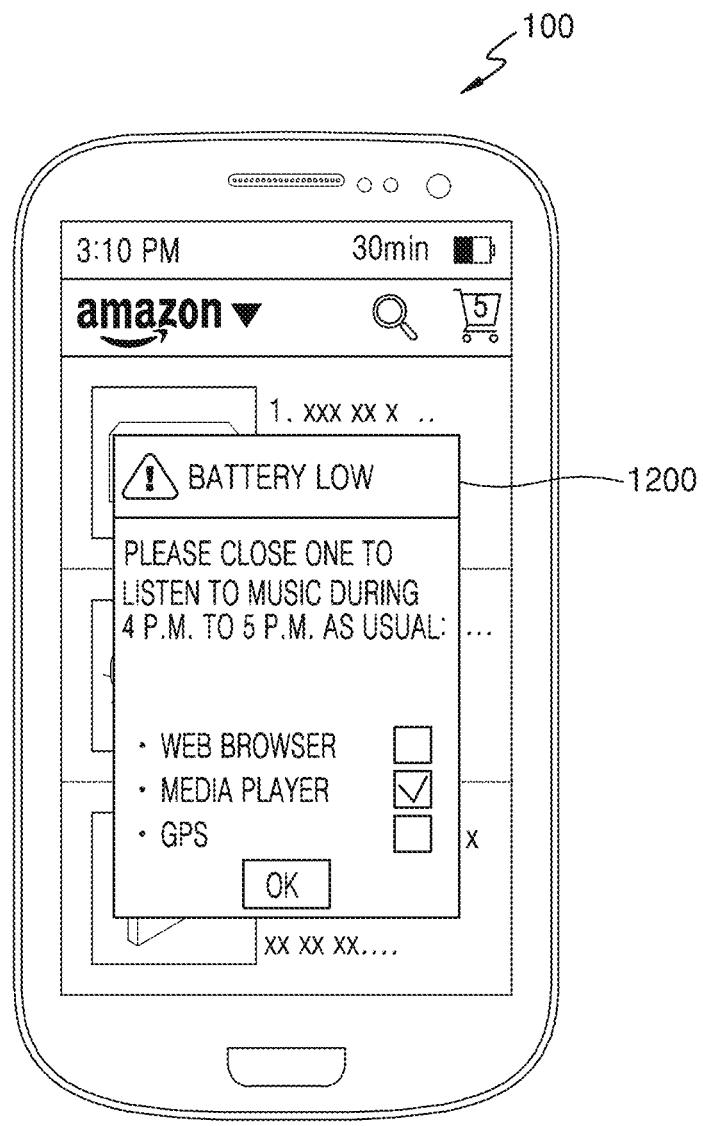
FIG. 12 is a diagram of a screen of a mobile device providing a battery power notification, according to an exemplary embodiment.

FIG. 12 is a diagram of a screen of the mobile device 100 providing a battery notification, according to an exemplary embodiment.

Referring to FIG. 12, based on the analysis of the usage pattern of the mobile device 100 of the user, when it is determined that the user has a habit of using a music player application to listen to music between 4 p.m. to 5 p.m., a battery alarm may be shown as in FIG. 12. That is, the controller 150 may display a message that informs the user an application to be closed or a hardware module of the mobile device 100 to be deactivated to save energy to run a future application among currently-running applications and thus extend a remaining battery life to a target battery level. Referring to FIG. 12, a message 1200 may show "Please close one to listen to music during 4 p.m. to 5 p.m. as usual: Web Browser, Media Player, GPS."

According to an exemplary embodiment, based on information from various modules in the mobile device 100, the controller 150 may make an intelligent determination of at least one application or a hardware module, such as a web browser, a GPS, and a media player, which may be closed or deactivated to allow a heart rate scan to be performed later, and then, display the determination on a battery notification message. In this case, a message may show only an application having a lower importance level than the future application, with reference to predetermined importance levels of applications. For example, when an importance level of a currently-running video call application is higher than that of a music player that is to be used in 1 hour, the mobile device 100 does not have to recommend the user to close the currently-running video call application to save battery power for using the music player in 1 hour.

Also, based on a location, time, and historical usage data of the user, the mobile device 100 may know that the user uses a map or a GPS function to find a destination after using an application, for example, a phone book application. Therefore, assuming that applications such as a map or a GPS will be used later, the mobile device 100 may notify the user to charge the battery in advance before starting heading to the destination via the user interface.

According to an exemplary embodiment, the mobile device 100 may dynamically display a battery indicator according to a currently-running or modified application.

Figure 13:
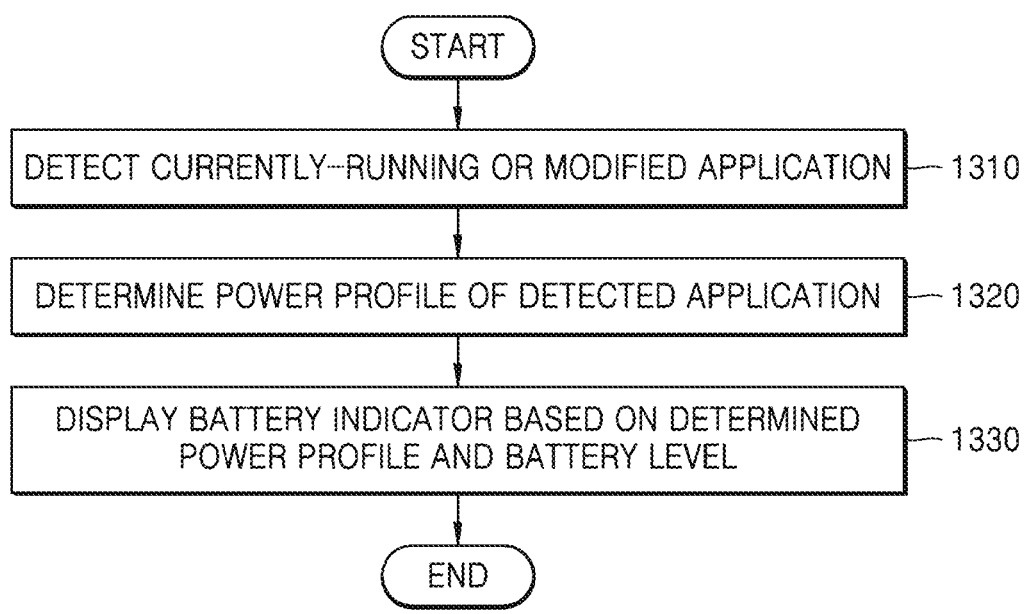
FIG. 13 is a flowchart of a method of dynamically displaying a battery indicator based on applications being run in a mobile device, according to an exemplary embodiment.

FIG. 13 is a flowchart of a method of dynamically displaying a battery indicator based on applications being run in the mobile device 100, according to an exemplary embodiment.

Referring to FIG. 13, in operation 1310, the mobile device 100 detects a currently-running or modified application.

In operation 1320, the mobile device 100 determines a power profile of the detected application.

According to an exemplary embodiment, the controller 150 of the mobile device 100 may determine the power profile of the detected application based on the power profile shown in FIG. 4A or 4B.

In operation 1330, the mobile device 100 displays a battery indicator based on the determined power profile and a current battery level.

The battery indicator includes displaying a remaining battery life by using a diagram and/or numbers.

Figure 14:
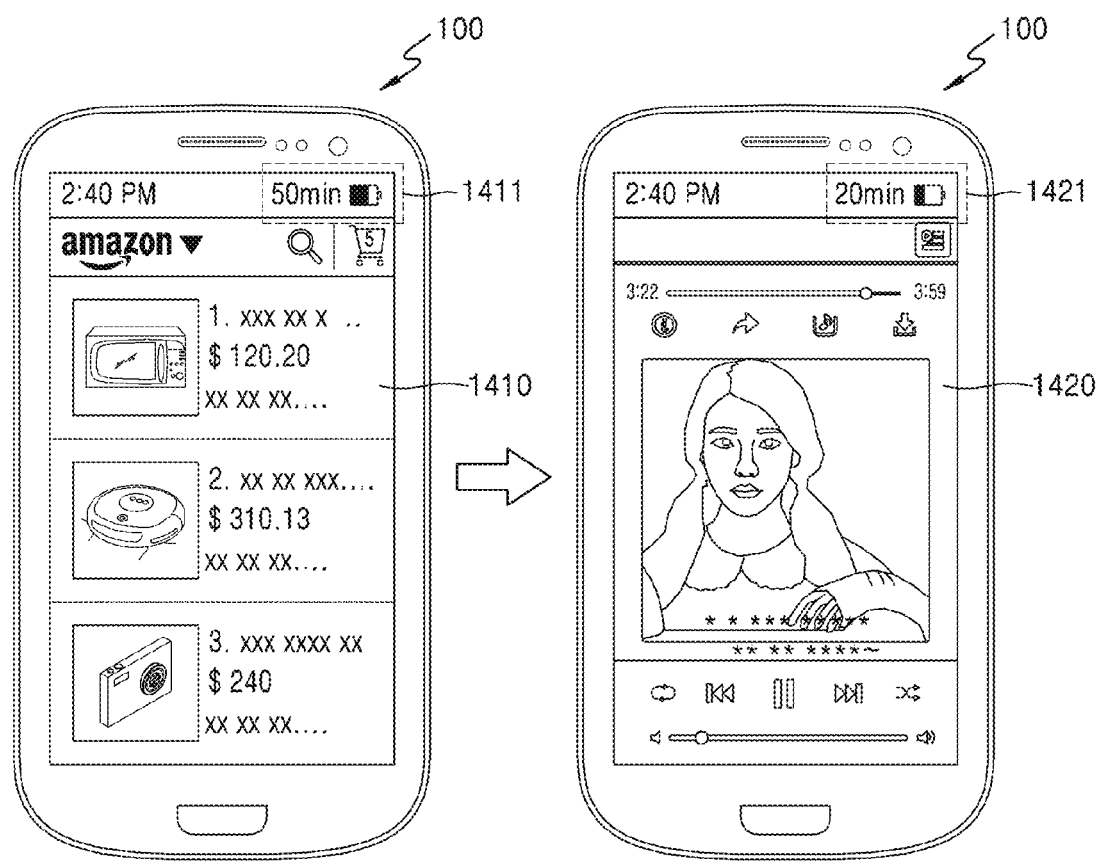
FIG. 14 is a reference diagram of the battery indicator of FIG. 13.

FIG. 14 is a reference diagram of the battery indicator of FIG. 13.

First, it is assumed that the user uses a web browser 1410.

Based on a power profile of the web browser 1410 and the current battery level, the mobile device 100 may know remaining time related to the web browser 1410 that is currently-running by the user. Therefore, according to an exemplary embodiment, via a display, the mobile device 100 displays a battery indicator 1411 indicating time (in this case, 50 minutes) that is maintainable when the web browser 1410 is continuously used.

In this case, it is assumed that the user uses a media player 1420 to watch a movie.

As a result, the mobile device 100 detects that a new application has been running based on a new usage of the user, determines a power profile that corresponds to the new application, i.e., the media player 1420, and relates this with historical power profiles and battery levels. As a result, the mobile device 100 may then determine that the user, based on his or her current activity, may have a reduced time (e.g., 20 minutes) remaining to watch the movie, compared to when the user browses the Internet. Therefore, the mobile device 100 may update the display on a battery indicator 1421, and thus inform the user that the user has only 20 minutes of time available to watch the movie before the battery is depleted or reaches a too-low threshold level.

Accordingly, the mobile device 100 may determine usage time according to various applications that are currently-running by the user, and update the battery indicators 1411 and 1421 based on power consumption of the current applications of the user. Therefore, the user may be informed, via the battery indicators 1411 and 1421, about a remaining time for the current applications, and thus, the user may be able to determine whether the remaining battery power will be sufficient for his or her future schedules.

According to an exemplary embodiment, the mobile device 100 may provide a battery notification by communicating with the remote device 500. Referring to FIGS. 15 to 19, an exemplary embodiment of providing a battery notification via communication with a remote device will be described.

Figure 15:
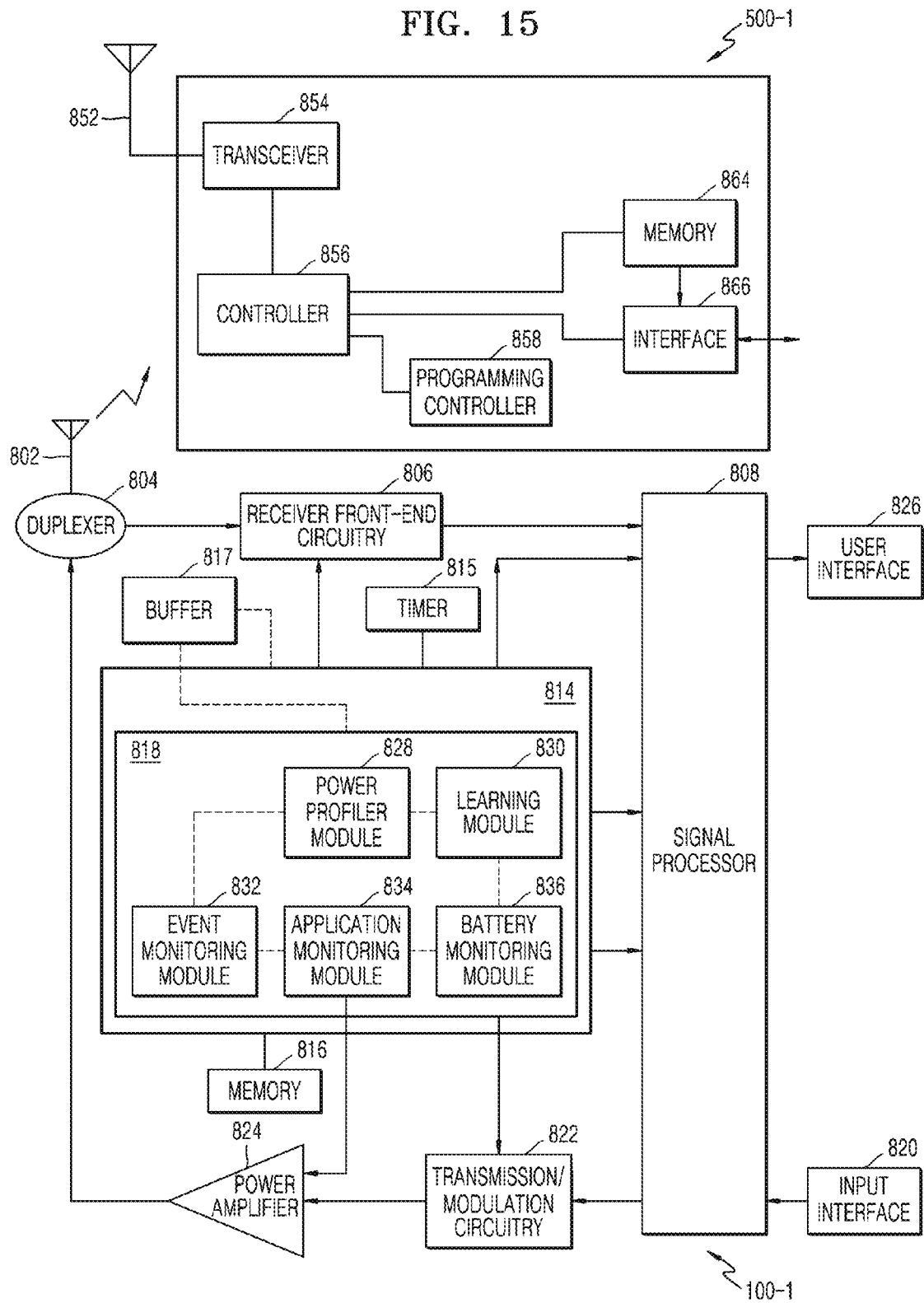
FIG. 15 is a block diagram of a mobile device communicating with a remote device, according to an exemplary embodiment.

FIG. 15 is a block diagram of a mobile device 100-1 communicating with a remote device 500-1, according to an exemplary embodiment.

The mobile device 100-1 includes an antenna 802 communicating with the remote device 500-1, and an antenna switch or a duplexer 804 that is coupled to the antenna 802 provides isolation between receive and transmit chains within the mobile device 100-1. One or more receive chains include receiver front-end circuitry 806 that effectively provides reception, filtering, and intermediate or base-band frequency conversion of received signals. The receiver front-end circuitry 806 is coupled to a signal processor 808 that is may be a digital signal processor (DSP). One of ordinary skill in the art may understand that the level of integration of receiver circuits or components may vary according to exemplary embodiments.

A controller 814 maintains overall operational control of the mobile device 100-1. The controller 114 is also coupled to the receiver front-end circuitry 806 and the signal processor 808 to control processes or circuits or components therein. According to exemplary embodiments, the controller 814 is also coupled to a memory 816 and a buffer 817 that selectively stores operating regimes, such as decoding/encoding functions, synchronization patterns, code sequences, and the like. A timer 815 is coupled to the controller 814, for example, to control the timing of operations (e.g., transmission or reception of time-dependent signals) within the mobile device 100-1.

The transmit chain includes an input interface 820. The input interface 820 is coupled in series through the signal processor 808, a transmitter/modulation circuitry 822, and at least one power amplifier 824 (or an amplification chain including a power amplifier) to the antenna 802. The antenna 802 may be in a form of an antenna array, or include a plurality of antennas. The transmitter/modulation circuitry 822 and the power amplifier 824 are controlled by the controller 814.

The signal processor 808 in the transmit chain may be implemented as distinct from a signal processor in the receive chain. Alternatively, a single processor may be used to implement processing of both transmit and receive signals, as shown in FIG. 15. Various components in the mobile device 100-1 may be realized in discrete or integrated component form, and an ultimate structure may vary according to applications or design selections.

The controller 814 may include additional system-level blocks 818, including, for example, a power profiler module 828, a learning module 830, an event monitoring module 832, an application monitoring module 834, and a battery monitoring module 836. These additional system-level blocks 818 may be applied to one or more exemplary embodiments and allow operations of the mobile device 100-1 to be more efficient.

Alternatively, the additional system-level blocks 818 may be located outside of the controller 814 and coupled to the controller 814.

According to an exemplary embodiment, the power profiler module 828 may create power profiles based on usage patterns of the user and/or applications accessed by the user. Furthermore, the power profiler module 828 may further rank determined usage patterns and/or accessed applications with an indication of the power consumed by the accessed applications, and subsequently store this information in a persistent or semi-persistent storage module, for example, the memory 816.

Alternatively, the controller 814 may determine an application that the user uses at a given location, time, day, etc., and the power profiler module 828 may create a power profile based on this information.

The controller 814 may learn, via the learning module 830, a behavior pattern variation of the user by using various applications with respect to time and location. For example, the user may use an application for an amount of time on a Monday morning at a supermarket.

The power profiles from the power profiler module 828 may be applied to the learning module 130 via, for example, Android® power monitoring after each application has been completed. In this manner, the learning module 830 may determine accumulated power data based on usage time of at least one application.

Power profiles of the user determined by the power profiler module 828 may include a table of entries relating to different power usage of applications with respect to location and time. Furthermore, a table corresponding to one application may include a value obtained by using a learning algorithm of the learning module 830.

The learning module 830 may determine a usage pattern of the user including, for example, GPS or Wi-Fi activity time and application runtime for applications accessed by the user. The learning module 830 may run continuously for an initial period to gain as much information as possible regarding hour-to-hour and/or day-to-day activity of the user. For example, one or more learning algorithms may be run continuously for an initial period, for example, 2-5 days, to gain as much device-usage information as possible.

The one or more learning algorithms may initially be run when the user has initially set-up the mobile device 100-1.

Also, the one or more learning algorithms may be run periodically, or at predetermined times that may be configured by the user or the mobile device 100-1.

During a period of the learning module 830, the learning module 830 may attempt to utilize system idle time, thereby not interfering with existing running applications on the mobile device 100-1 of the user.

The learning module 830 may record a time stamp when one or more components/circuits/processes enter a new state, which may subsequently be retrieved by a device driver.

Furthermore, after an initial period has expired, the learning module 830 may transition to an 'on-demand' mode of operation. During an 'on-demand' mode of operation, the learning module 830 may utilize patterns 'learned' from previous learning periods.

When a 'charging period' is detected, for example, when the mobile device 100-1 is connected to a charger, the learning module 830 may perform one or more further checks of the determined profile, for example, to determine up-to-date application runtimes, data usage, etc. During such further checks, all updates to runtimes, data usage, etc. may be fed into the learning algorithms of the learning module 830.

Furthermore, the learning module 830 may operate a callback service with various registered applications, to obtain periodic or triggered information/data updates. Such a callback service may be dormant for most of the time. For example, the learning module 830 may register a callback with applications such as an Outlook calendar, Facebook, Twitter, e-mail messages, text messages, voice conversation analyzer, etc., and be notified when any new events that have been added may be of relevance to the learning module 830. Upon receiving a callback, the learning module 830 may add relevant entries to an event list, which may be located within the event monitoring module 832, and relate the entries with learned data.

The event monitoring module 832 may monitor user events, for example, upcoming events stored in calendar entries or e-mails. Furthermore, the event monitoring module 832 may monitor flagged events, such as health monitoring applications, which run at times. The flagged events may be user-defined or defined by the remote device 500-1. The remote device 500-1 may be owned by a third party.

The application monitoring module 834 may monitor applications that the user may have accessed or utilized. Furthermore, the application monitoring module 834 may monitor flagged applications of importance. For example, a well-being application may be flagged as important and, therefore, the application monitoring module 834 may monitor a user's usage of this application. When a user fails to utilize a flagged application at a given time or locations, the application monitoring module 834 may highlight this failure to the controller 814. In response to this, the controller 814 may control the mobile device 100-1 such that the remote device 500-1 is informed of this failure, or remind the user to run the application.

The battery monitoring module 836 may monitor the current battery may aid in determining/estimating an operational time for the remaining battery power of the mobile device 100-1, for example, based on previous usage pattern and current usage of the user. Furthermore, the battery monitoring module 836 may aid in determining a level of battery power for future scheduled applications, based on past, present, and/or future mobile device usage of the user.

In this example, the controller 814 may interrogate the mobile device 100-1 by checking for upcoming user events, battery status, and ensuring that the data is passed to a user interface 826 to be updated appropriately.

The user interface 826 may display battery notifications to the user.

The mobile device 100-1 may limit memory access with mobile device usage by not continuously writing data to the memory 816. For example, relevant information determined from various modules in the mobile device 100-1, for example, the power profiler module 828, the learning module 830, the event monitoring module 832, the application monitoring module 834, and the battery monitoring module 836, may be assessed and in some instances collated and persisted to flash memory periodically, for example, every 30 minutes, to ease the burden of managing and strategically employing limited battery power and avoid losing the information when the mobile device 100-1 is shut down unexpectedly, for example, when the battery reaches zero remaining capacity.

Such information gathering exercises may be performed in various ways, for example, via a 'push' or 'pull' type arrangement. For example, when a service being performed by a mobile device of the user is aware of a change happening to a component in the mobile device (e.g., a video stream is no longer being used), the service may 'push' that state change information to the battery monitoring module 836, so that a remaining battery level/time determination may be updated. Otherwise, when applications utilize components such as the signal processor 808, data may be periodically collected from the active components to determine the battery usage at transition points such as when a component starts or stops an activity.

The mobile device 100-1 may monitor current power usage levels of various applications over a period of time, and store information relating to the power usage levels in persistent storage, for example, the memory 816. This stored information may include a battery power usage according to time information while the applications are being used.

The power profile of an application or group of applications, used during the profile period, may include details relating to time/location/usage time, etc. as well as consumed power.

When an activity 'X' is in use and has a power profile indicating that activity 'X' consumed Y mA, according to an exemplary embodiment, the user may be provided with a notification as to how much longer the activity 'X' may be continued based on current estimated battery life.

Also, the mobile device 100-1 may provide a dynamic notification regarding a remaining percentage of battery power or time left based on estimated power used by currently-running applications (including background tasks) and battery levels.

When a time scale for completing an activity may be determined, for example, based on travelling to a destination, video/music playback, etc., a user may be alerted via an audio, visual, or motion/vibration notification as early as possible to connect the mobile device 100-1 to a power source to be recharged.

To provide an early recharge warning to the user, power profiles may be determined by taking into account future schedules of the user, which may be based on calendar entries, Facebook events, to-do-lists, etc.

When the mobile device 100-1 determines that the mobile device 100-1 may be away from a power source for longer than usual (e.g., based on a predetermined power profile), for example, determined from an extended travelling time period and being remote from a location where charging usually occurs, the mobile device 100-1 may provide the user with an early warning notification to charge the battery.

Also, the mobile device 100-1 may provide a battery notification to a user interface, such as a display. The battery notification may be based on a sequence of action profiles and may consider priorities of different tasks in relation to available power. The battery notification may be dynamically updated.

The mobile device 100-1 may provide instantaneous battery consumption as a battery notification to the user so that the user may select from a variety of actions to conserve power immediately.

The mobile device 100-1 may be coupled to the remote device 500-1 that may be owned by a third party. The remote device 500-1 may monitor the mobile device 100-1 and acquire battery information such as remaining battery life or a battery charge status. The remote device 500-1 includes a controller 856 and a transceiver 854 that is coupled to the controller 856. The controller 856 may wirelessly transmit a battery information request to the mobile device 100-1 (and/or a peripheral device paired with the mobile device 100-1, via the mobile device 100-1). In response to the request, the mobile device 100-1 (and/or the peripheral device paired with the mobile device 100-1) interrogates a current battery level and transmits a battery level of the mobile device 100-1 (and/or the peripheral device paired with the mobile device 100-1).

The battery level, which is received via the transceiver 854 of the remote device 500-1, may be stored in a memory 864.

The remote device 500-1 may include a programming controller 858 to remotely control functionality of the mobile device 100-1 (and/or the peripheral device paired with the mobile device 100-1). The memory 864 and/or the controller 856 is/are coupled to an interface 866 to enable a user of the remote device 500-1, for example, a medical doctor, to utilize the mobile device 100-1 (and/or the peripheral device paired with the mobile device 100-1). For example, the remote device 500-1 may include a TV.

The exemplary embodiments may be applied to a mobile grid computing application, in which the mobile device 100-1 may communicate with a plurality of other mobile devices to carry out some tasks. When a workload is given, energy to carry out a workload within a set of participating devices may be used to determine which participating device or set of devices will be computing the workload by using minimum battery consumption, or which one is the optimal one to carry out a task by considering a battery charge period. Each participating mobile device may share remaining battery charge data with other participating devices. This information may be used to predict which optimal device is to perform a task.

The mobile device 100-1 may use the controller 814, the power profiler module 828, the battery monitoring module 836, and the application monitoring module 834 to determine whether the user has any future scheduled events.

The controller 814 may determine future events of the user by using at least one of schedules of the mobile device 100-1, calendar function, and synchronized date information from e-mail. Furthermore, the controller 814 may determine the future events of the user from the learning module 830. The learning module 830 may 'learn' an activity schedule at a day of a week of the user.

The controller 814 may determine at least one future event that is of the user. The future event may have been scheduled by the user, and in some examples, remotely scheduled by the user or by a third party via the remote device 500-1.

The controller 814 may be able to determine future activities based on third party applications, for example, Facebook events, to-do lists, and dates within SMS messages.

When the controller 814 determines that, based on current usage of the user, a current remaining battery life, etc., a future event may not be able to be completed with current remaining battery power, the controller 814 may inform the user about a battery power problem via the user interface 826.

The controller 814 may display a message to the user, informing the user of an upcoming future event/appointment and requesting the user to connect the mobile device 100-1 to a charger to ensure that the mobile device 100-1 has power for the upcoming future event/appointment.

For example, according to the determination of the controller 814, when the user has an event in 4 hours and the battery level is only 40% according to the battery monitoring module 836, the controller 814 may determine that, based on current usage of the mobile device 100-1, a power profile may cause the battery to deplete before and/or during the upcoming future event. Therefore, the controller 814 may output a battery warning message via the user interface 826. For example, a message may be similar to "You have schedule in 4 hours, and only 3 hours battery remaining at current usage level. Please connect to charger," as shown in FIG. 8.

Another notification may be implemented with the message. For example, an audible notification such as a ring tone, a visual notification such as a notification light, or vibration may be used to inform the user of an issue with remaining battery power.

The above-described notifications may be implemented via a peripheral device, for example, a smart device such as Galaxy Gear®.

A portion of or the entire message may include different colors, font, or text size so that the user may be informed of an importance level of the message.

The controller 814 may use locations data, current time, etc. to determine when and how early a notification is passed to the user interface 826. For example, when the controller 814 determines that, based on a scheduled meeting with historical power profiles from the power profiler module 828, the user may be away from a power source for a long period of time due to a meeting that requires travelling for longer than usual, the controller 814 may provide an early notification to the user.

The controller 814 may set extra power to the remaining battery life to allow an emergency voice call/SMS.

Figure 16:
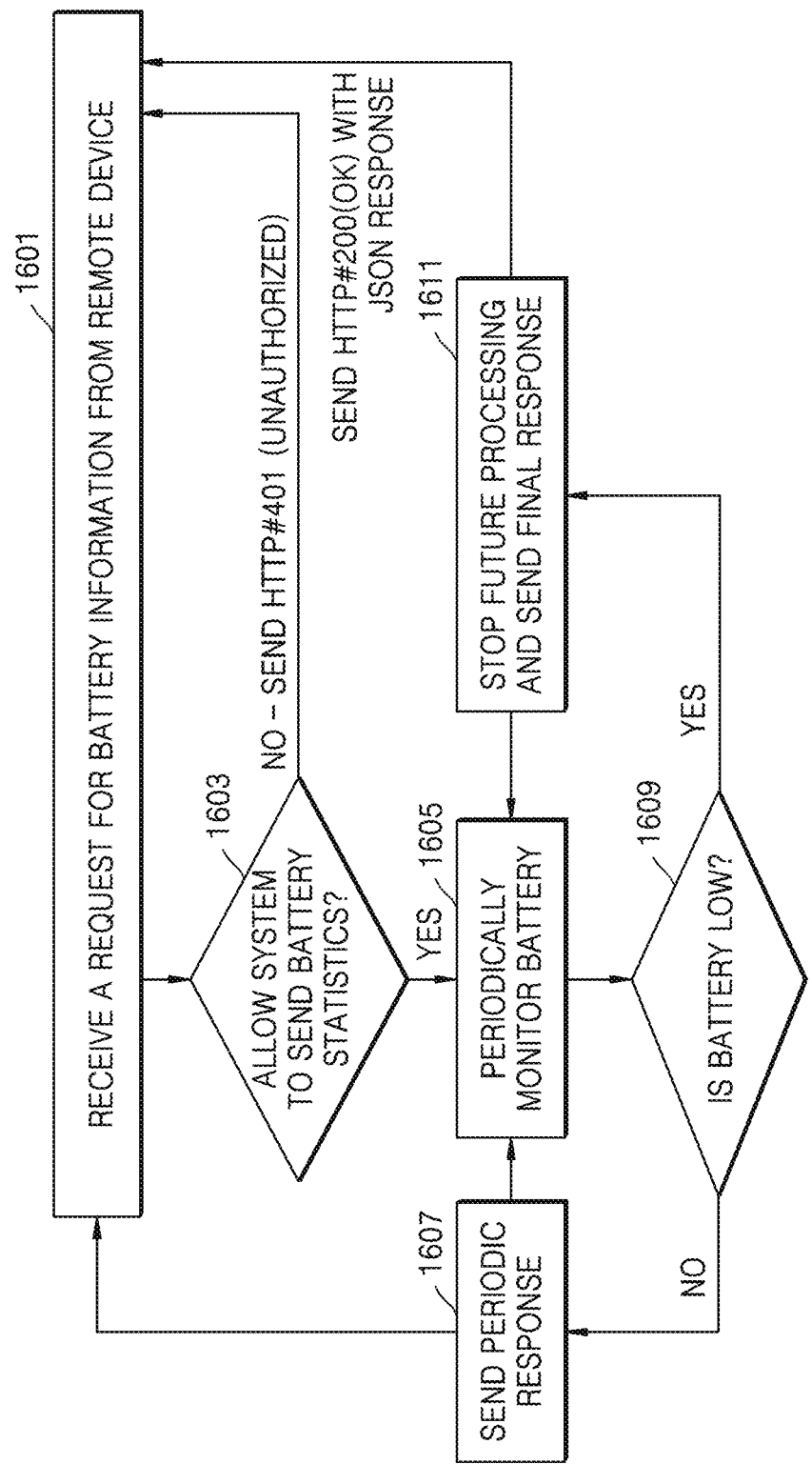
FIG. 16 is a flowchart of processes performed by a mobile device communicating with a remote device to provide a battery power notification, according to an exemplary embodiment.

FIG. 16 is a flowchart of processes performed by the mobile device 100-1 communicating with the remote device 500-1 to provide a battery notification, according to an exemplary embodiment.

A third party may be a remote agency, hospital, or device manufacturer. In some examples, the third party may be a telemedicine administrator.

In operation 1601, the mobile device 100-1 receives a request for battery information from the remote device 500-1, which is controlled by the third party.

In operation 1603, the mobile device 100-1 determines whether to allow the system to send battery statistics to the third party.

The battery statistics may include current battery levels, predicted battery levels based on current and historic usage, and an intelligent determination of remaining battery capacity based on future usage that is determined based on events due to various applications in the mobile device 100-1.

The controller 814 of the mobile device 100-1 may also determine whether battery statistics of the mobile device 100-1 are to be provided to the third party via the mobile device 100-1. The battery statistics may include battery statistics of one or more peripheral devices.

The controller 814 may make the determination in operation 1603 based on user instructions or preconfigured programming. Therefore, the user may be able to prevent the third party from accessing battery information. However, in some examples, 'critical applications' may be able to override any user settings and allow the third party to access battery related information. The user may agree in advance to allow 'critical applications' to override user settings relating to providing battery information to the third party. For example, 'critical applications' may be applications related to important activities for user's health care When the mobile device 100-1 determines not to allow the system to send the battery information to the third party in operation 1603, the mobile device 100-1 sends a negative response to the third party via, for example, an HTTP#401 (unauthorized) message. Otherwise, when the mobile device 100-1 determines to allow the system to send the battery information to the third party, the mobile device 100-1 proceeds to operation 1605.

In operation 1605, the mobile device 100-1 periodically monitors the battery level, and collective battery information including, for example, remaining battery life information based on past, present, and future applications.

In operation 1609, the mobile device 100-1 determines whether the battery level of the mobile device 100-1 and/or the one or more peripheral devices is low. An algorithm similar to an algorithm may be utilized to determine the battery level. When the mobile device 100-1 determines that the battery level is low, the number of monitoring events in operation 1605 may increase, and the mobile device 100-1 proceeds in operation 1611. Otherwise, the mobile device 100-1 proceeds in operation 1607.

In operation 1611, the mobile device 100-1 stops future processing and sends a final response, for example, HTTP#200(OK) with a JavaScript Object Notation (JSON) response, to the third party to inform about battery insufficiency.

Furthermore, the mobile device 100-1 may not only transmit a response to the third party, but also notify the battery monitoring module 836 so that periodic monitor events may be amended.

In operation 1607, the mobile device 100-1 sends a periodic response to the battery monitoring module 836 so that the monitoring events are amended in operation 1605. Also, the periodic response in operation 1607 may be transmitted to the third party, and inform the third party that the battery of the mobile device 100-1 is within acceptable limits.

Battery monitoring of the mobile device 100-1, at least including operations 1605, 1609, 1607, and 1611 may be performed without a request from the third party in operation 1601. According to an exemplary embodiment, the battery monitoring including at least these operations may be performed.

Figure 17:
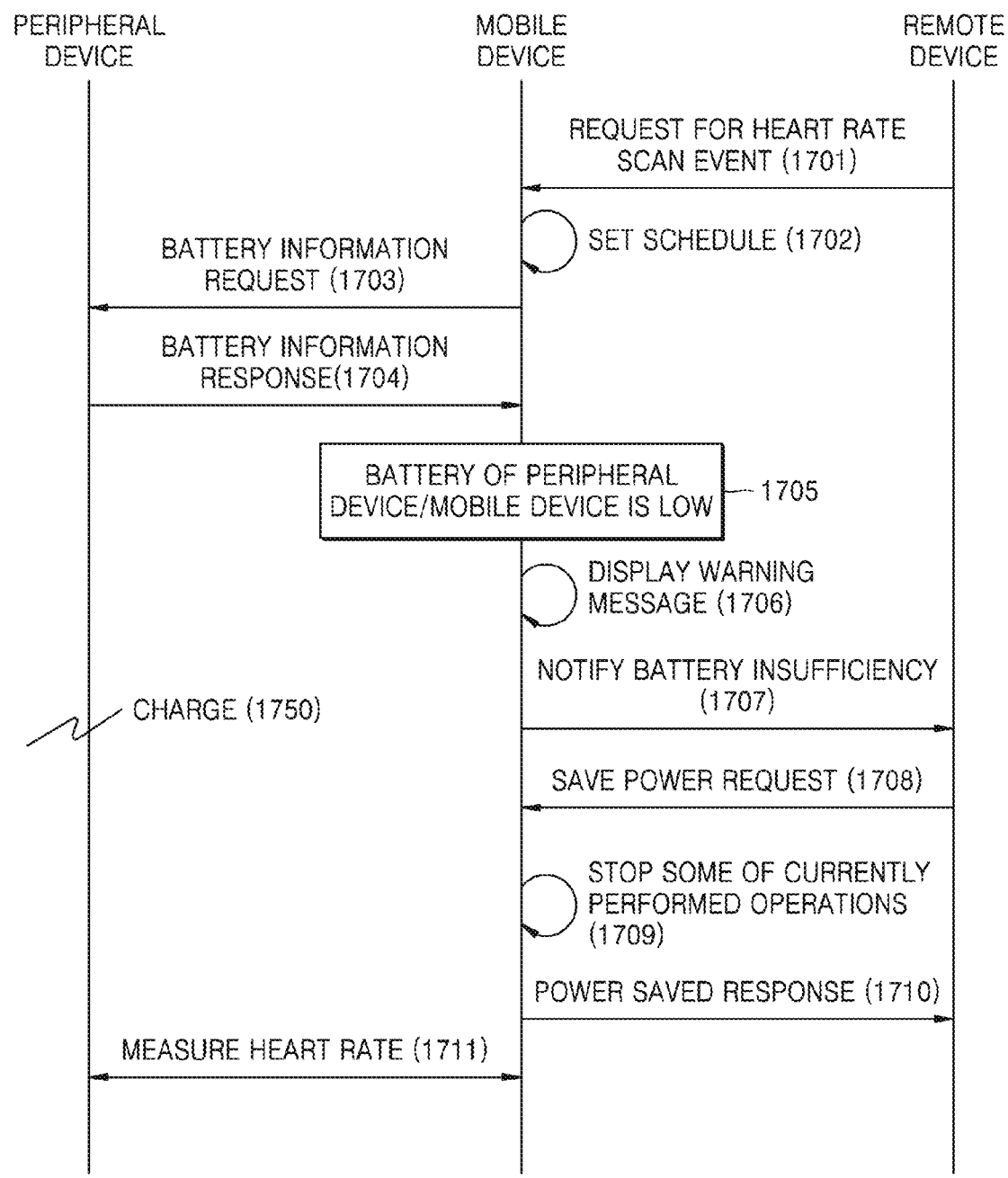
FIG. 17 is a flowchart of processes performed by a mobile device communicating with a peripheral device and a remote device to provide a battery power notification, according to an exemplary embodiment.

FIG. 17 is a flowchart of processes performed by a mobile device communicating with a peripheral device and a remote device to provide a battery notification, according to an exemplary embodiment.

In operation 1701, a remote device (e.g., a remote control system in a hospital) requests for a heart rate scan event. This request may include an ID of an application to be run for the heart rate scan, a runtime of the application, and information of a paired peripheral device.

In operation 1702, the mobile device sets a schedule according to the request of the remote device. That is, the mobile device is set such that the application is run at a time that is requested by the remote device.

In operation 1703, the mobile device requests battery information from a peripheral device. In this case, the peripheral device is assumed as a wearable device that is paired with a heart rate scan application and used to measure heart rates of a user.

In operation 1704, the peripheral device transmits current remaining battery life information as a response to the mobile device.

In operation 1705, based on the battery information from the peripheral device, the mobile device determines whether battery of the mobile device and/or the peripheral device is low, i.e., not enough to run an event requested by the remote device. In this case, a power profile of the heart rate scan application may be referenced. According to an exemplary embodiment, it is determined that the batteries of the mobile device and the peripheral device are insufficient.

In operation 1706, the mobile device displays a warning message informing that the battery is insufficient. As described above, a battery notification may be provided via a visual message, sounds, and vibrations.

In operation 1750, the user that has seen the warning message connects the peripheral device to a charger to charge the peripheral device. However, the user does not connect the mobile device to a charger or perform other operations for saving battery power.

In operation 1707, the mobile device notifies the remote device of the current battery insufficiency to perform the request event.

In operation 1708, the remote device that has been informed of battery insufficiency requests the mobile device to save power.

In operation 1709, the mobile device stops or closes some of currently-performed operations to save energy for the heart rate scan event. For example, a currently-running music player or an application that operates a hardware module such as Wi-Fi and GPS is closed. Such closing may be immediately performed when the power save request 1708 is received from the remote device, or performed when battery power is not saved until a time, for example, 30 minutes, before a scheduled event time.

In operation 1710, the mobile device informs the remote device that power energy for the heart rate scan event is saved as a response to the remote device.

In operation 1711, the mobile device runs the heart rate scan application at the time scheduled according to the request of the remote device, and measures the heart rate of the user in association with the heart rate peripheral device.

Figure 18A:
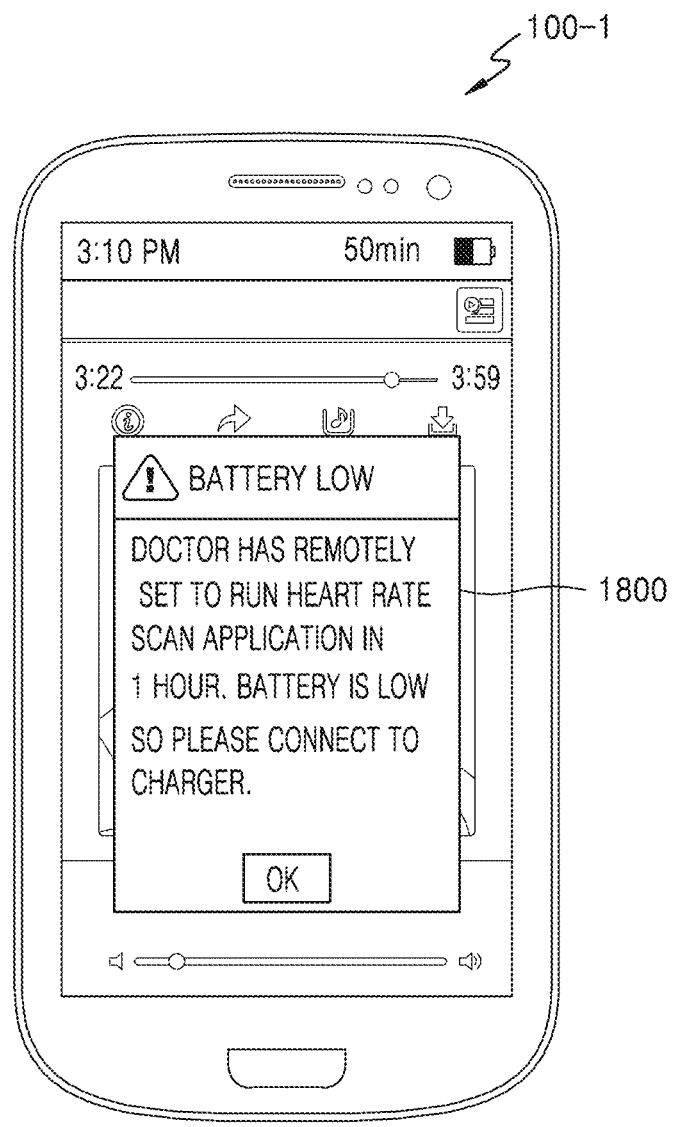
FIGS. 18A and 18B are diagrams of a screen of a mobile device that provides a battery power notification under control of a remote device, according to an exemplary embodiment.
Figure 18B:
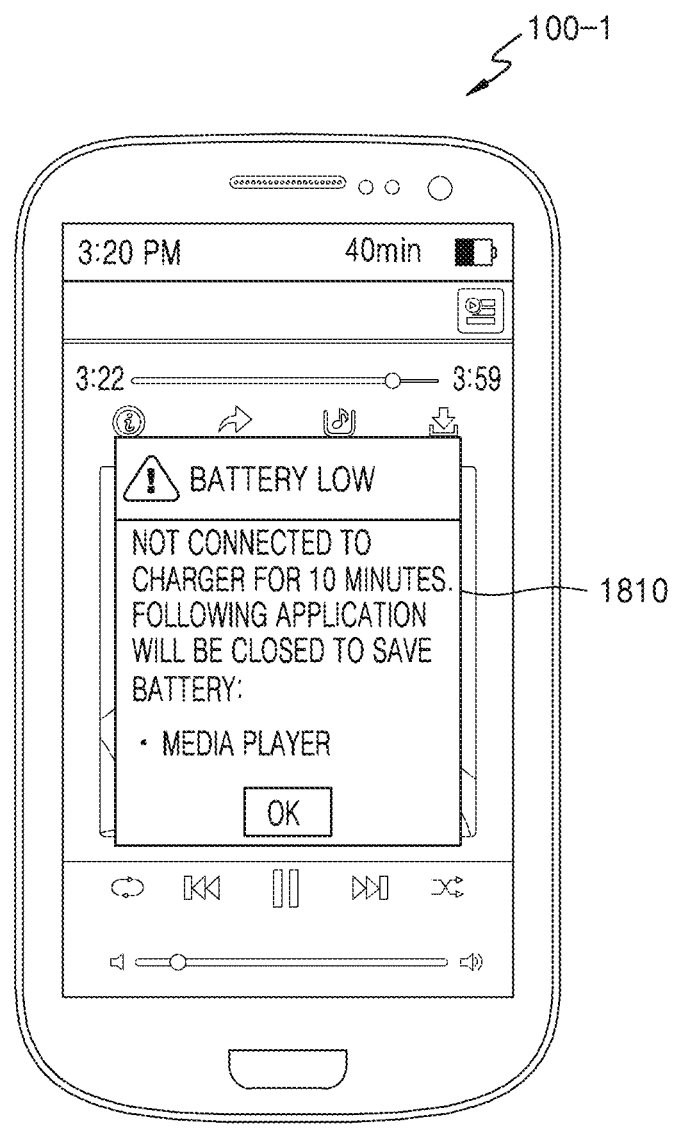

FIGS. 18A and 18B are diagrams of a screen of the mobile device 100-1 that provides a battery notification under control of a remote device, according to an exemplary embodiment.

As described above, in the case of 'critical applications,' the third party (e.g., a remote control system in a hospital) may remotely determine future events to be performed in a mobile device of a user.

According to an exemplary embodiment, a screen displays a battery notification under the control of a third party while the user had been watching a movie via a media player application. A doctor of the user may set the mobile device of the user such that a heart rate scan application is run in 1 hour. Based on the power profile, the mobile device may determine that a current remaining battery life is insufficient to run the application in 1 hour, and accordingly, display a battery notification as shown in FIG. 18A.

Referring to FIG. 18A, the mobile device 100-1 may display a battery notification 1800 including a message "Doctor has remotely set to run heart rate scan application in 1 hour. Battery is low so please connect to charger."

FIG. 18B shows a screen of the mobile device 100-1 when the user has ignored the battery notification 1800 of the FIG. 18A and continued to watch the movie. That is, when the user has not charged the mobile device 100-1 for 10 minutes after the battery notification 1800 of FIG. 18A is displayed, the mobile device 100-1 may display a message as shown in FIG. 18B. A battery notification 1810 of FIG. 18B may include a message "Not connected to charger for 10 minutes. Following application will be closed to save battery. Media player". Accordingly, the mobile device 100-1 may close the currently-running media player application to save a battery level for a future event requested by the doctor of the user.

Figure 19:
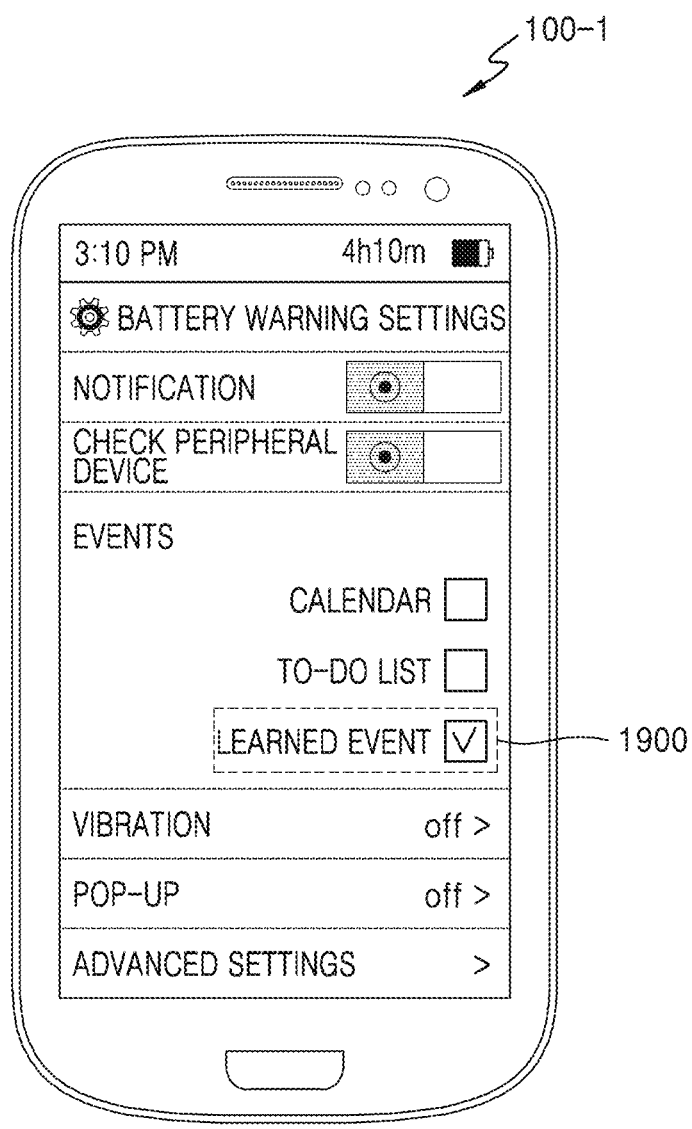
FIG. 19 is a diagram of a screen for setting a type of an event to be applied to a battery power notification in a mobile device, according to an exemplary embodiment.

FIG. 19 is a diagram of a screen for setting a type of an event to be applied to a battery notification in the mobile device 100-1, according to an exemplary embodiment.

As described above, the mobile device may determine future applications based on events stored in schedule management applications, such as calendar entries, to-do lists, and Facebook events. Alternatively, the mobile device may predict future applications according to the machine learning algorithm by analyzing historical mobile device usage pattern of the user.

The screen illustrated in FIG. 19 shows a menu for setting a type of an event to be applied to the battery notification in the mobile device. The user may select, via a "learned event" menu 1900, whether to display the battery notification with respect to the future application predicted by the mobile device.

According to an exemplary embodiment, the mobile device may provide the battery notification via communication with a peripheral device. This will be described with reference to FIGS. 20 to 22.

Figure 20:
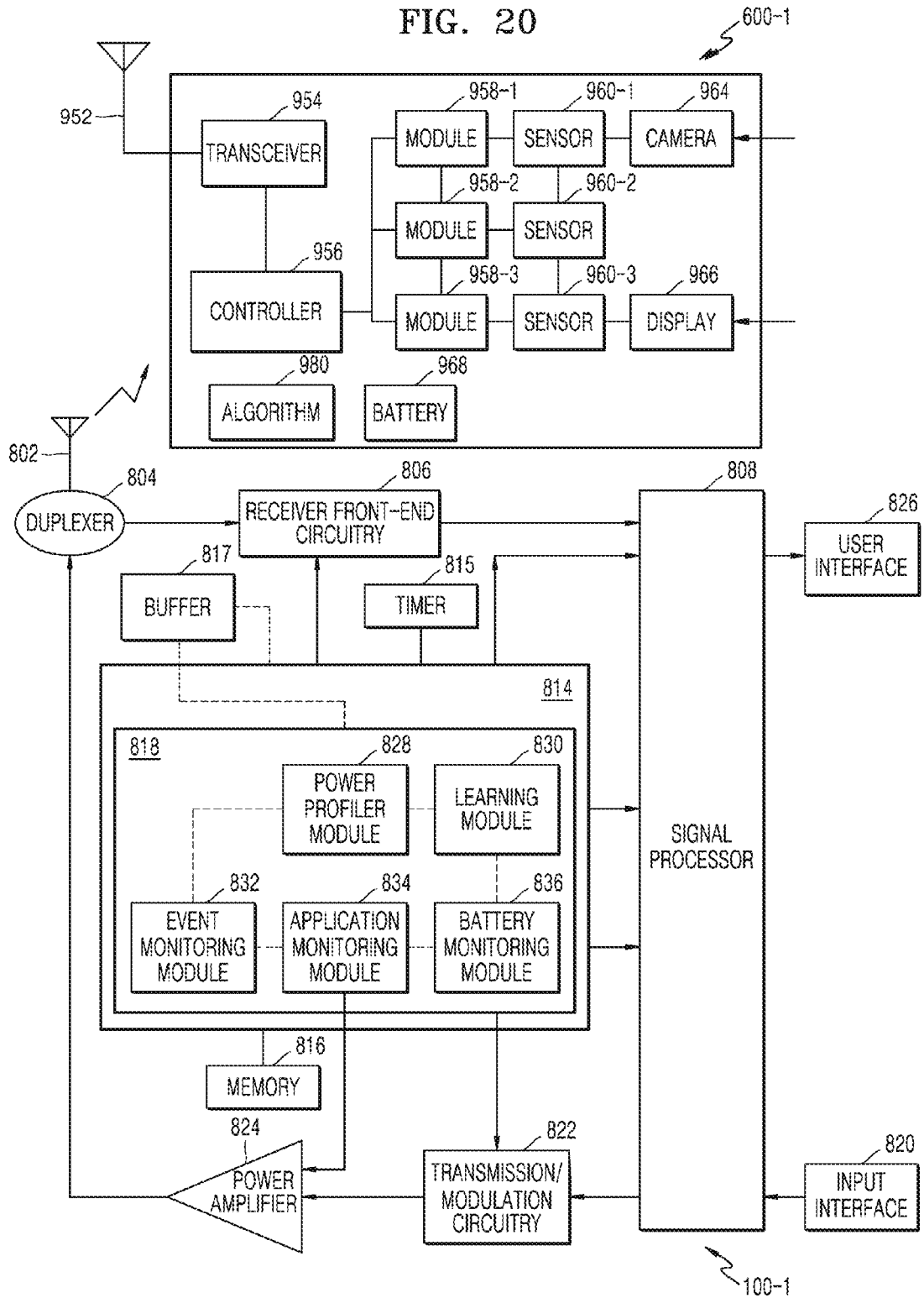
FIG. 20 is a block diagram of a mobile device and a peripheral device, according to an exemplary embodiment.

FIG. 20 is a block diagram of the mobile device 100-1 and a peripheral device 600-1, according to an exemplary embodiment.

The peripheral device 600-1 may be a smart watch such as a Galaxy Gear®, a health monitoring device such as a heart rate monitor for S Health® applications, a headset, a wireless keyboard, etc.

The peripheral device 600-1 may be connected to the mobile device 100-1 via an antenna 952. The antenna 952 may be coupled to a transceiver 954.

The transceiver 954 may include at least one of Bluetooth, infrared rays, Wi-Fi, NFC, and S beam. S beam utilizes NFC to establish a Wi-Fi direct connection between at least two compatible devices for data transfer.

The transceiver 954 may be coupled to a controller 956 such that the controller 956 maintains operational control of the peripheral device 600-1.

The controller 956 may pass some operational control to the mobile device 100-1, for example, when a tethering process has been established between the mobile device 100-1 and the peripheral device 600-1.

The peripheral device 600-1 may include modules 958-1, 958-2, and 958-3. The number and type of the modules 958-1, 958-2, and 958-3 may vary according to a type of a peripheral device being utilized. The modules 958-1, 958-2, and 958-3 may measure a status or environments of the user.

The modules 958-1, 958-2, and 958-3 may include health monitoring modules that are used for health monitoring applications, such as heart rate monitoring, blood pressure monitoring, or body temperature monitoring. Other modules may be included.

The modules 958-1, 958-2, and 958-3 may include modules that may mirror some functionality of the mobile device 100-1 when, for example, a connection has been established between the peripheral device 600-1 and the mobile device 100-1.

The modules 958-1, 958-2, and 958-3 may mirror applications such as a contact list of the user, a phone function, a messaging function, a notification/calendar function, and/or a function of a camera 964.

Also, the peripheral device 600-1 may include a plurality of sensors 960-1, 960-2, and 960-3, for example, a temperature sensor, an accelerometer, and a gyro-sensor.

Also, the peripheral device 600-1 may include a display 966 and a battery 968.

A potential problem may occur when, for example, a user of the peripheral device 600-1 is to perform a heart rate scan, but the battery capacity of the peripheral device 600-1 may not have enough charge to perform this scan at a time in the future. Therefore, currently, the user may not be aware that the heart scan cannot be performed at a future scheduled time.

Also, a health monitoring application may have been remotely scheduled for a user for a time in the future. A problem may occur when the user has been utilizing the peripheral device 600-1 for other applications without knowing that the battery is to be saved to run the health monitoring application in the future. The above-described problems may be exacerbated when, for example, the peripheral device 600-1 does not include a battery level displaying function.

Therefore, once the mobile device 100-1 has established a connection with the peripheral device 600-1, the mobile device 100-1 may be operated to interrogate the peripheral device 600-1 to determine available power of the peripheral device 600-1.

The peripheral device 600-1 may transmit periodic power information to the mobile device 100-1 once a connection between the peripheral device 600-1 and the mobile device 100-1 is established. Furthermore, the number of periodic transmissions may change dynamically based on the remaining power level of the peripheral device 600-1.

The mobile device 100-1 and/or the peripheral device 600-1 may additionally include an algorithm 980. The algorithm 980 may receive power level information related to the peripheral device 600-1, and determine, based on the current power level of the peripheral device 600-1 and future events, whether the peripheral device 600-1 may perform current or future measurement events. In this case, the algorithm 980 is implemented within the controller 914. However, according to another exemplary embodiment, the algorithm 980 may be implemented outside of the controller 914. According to another exemplary embodiment, the algorithm 980 may be implemented within additional system-level blocks. The additional system-level blocks may be located outside the controller 914 and be coupled to the controller 914.

Figure 21:
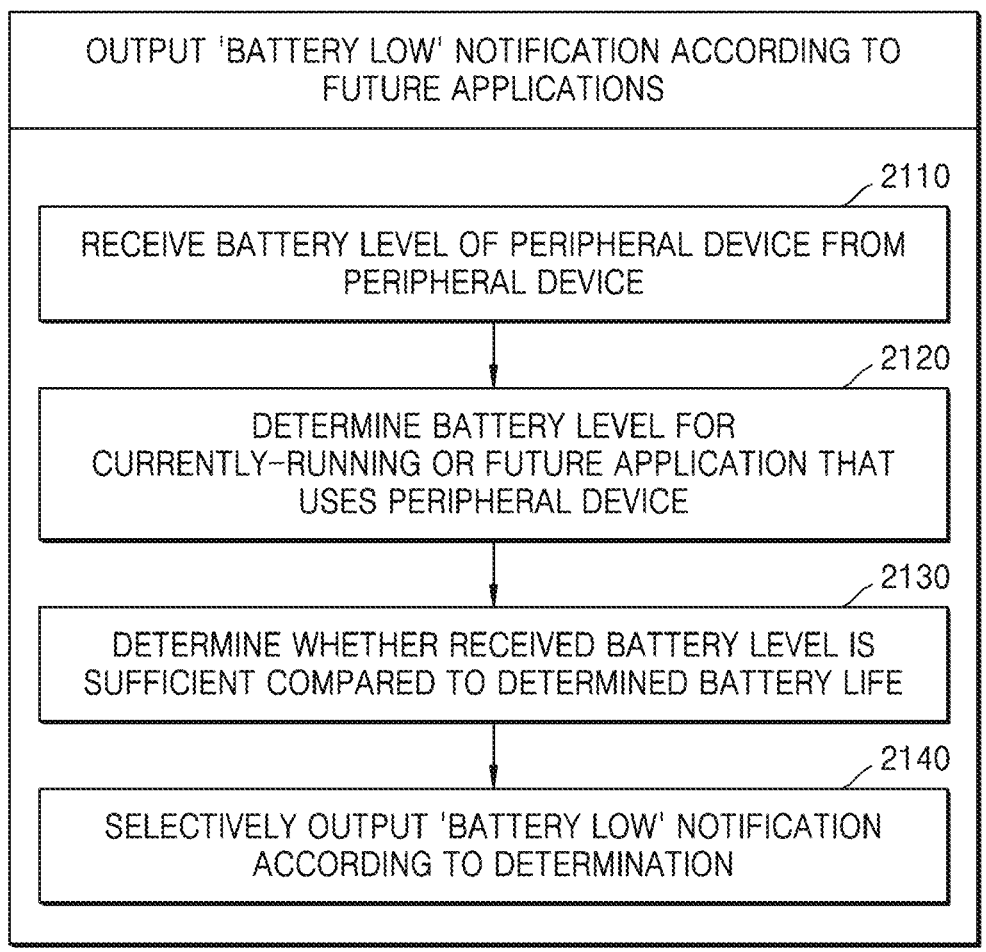
FIG. 21 is a flowchart of processes of outputting a 'battery low' notification depending on future applications, according to an exemplary embodiment.

FIG. 21 is a flowchart of processes of outputting a 'battery low' notification depending on future applications, according to an exemplary embodiment.

Referring to FIG. 21, in operation 2110, the mobile device 100-1 receives a battery level of the peripheral device 600-1 from the peripheral device 600-1.

According to an exemplary embodiment, the mobile device 100-1 may receive periodic battery level information from the peripheral device 600-1 that is coupled to the mobile device 100-1. The periodic battery level information may indicate a remaining battery level of the peripheral device 600-1.

According to an exemplary embodiment, the mobile device 100-1 may receive the battery level information from the peripheral device 600-1 in response to a battery level information request that is sent to the peripheral device 600-1.

In operation 2120, the mobile device 100-1 determines battery life for a currently-running or future application to be run that uses the peripheral device 600-1.

In operation 2130, the mobile device 100-1 determines whether the received battery level of the peripheral device 600-1 is sufficient compared to the determined battery life.

In operation 2140, the mobile device 100-1 selectively outputs a 'battery low' notification according to the determination whether the received battery level is sufficient.

Figure 22:
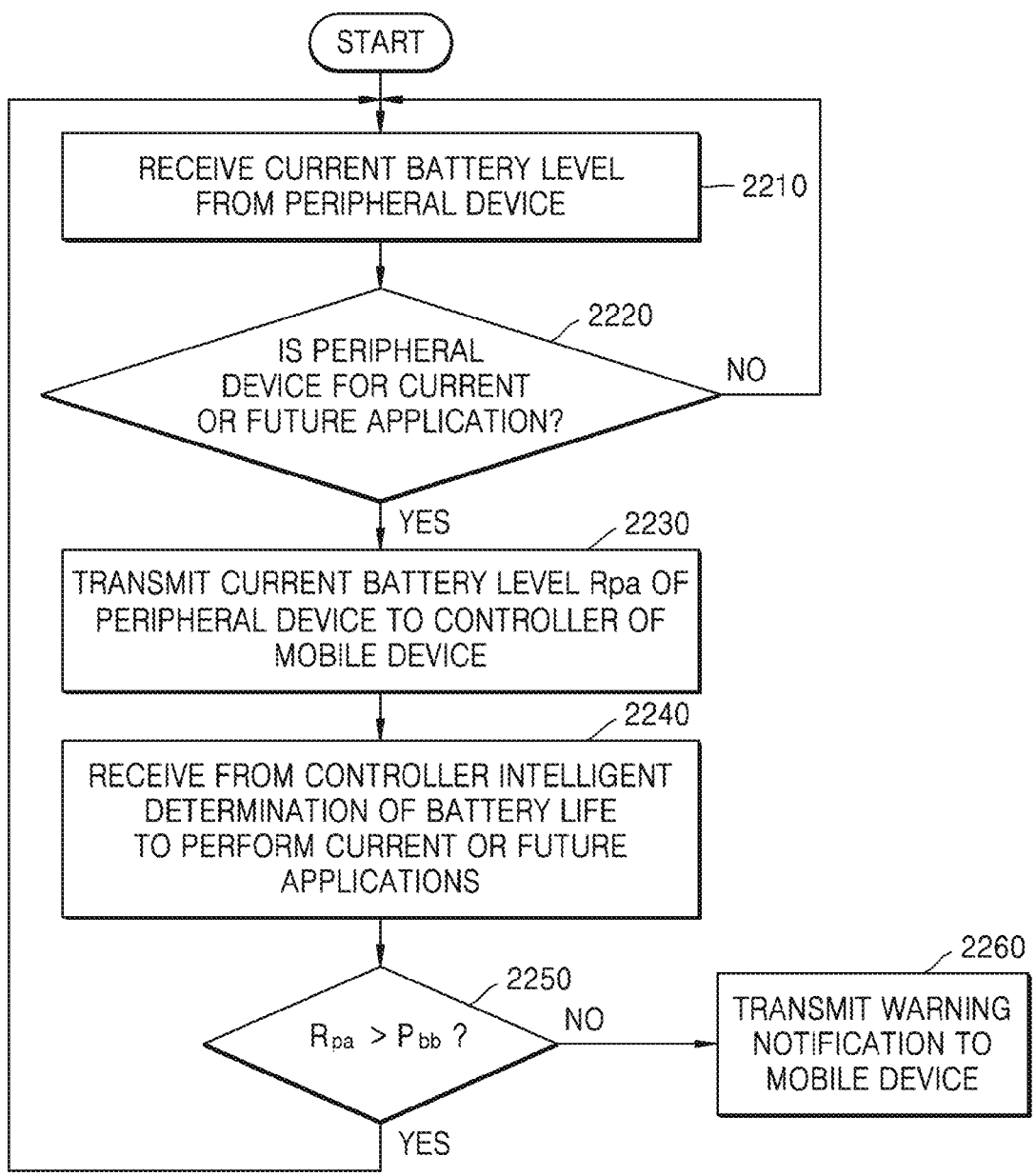
FIG. 22 is a flowchart of an algorithm of a mobile device providing a battery power notification based on battery information of a peripheral device, according to an exemplary embodiment.

FIG. 22 is a flowchart of an algorithm of a mobile device providing a battery notification based on battery information of a peripheral device, according to an exemplary embodiment. Such algorithm may be the algorithm 980 of the peripheral device 600-1 of FIG. 20 or the algorithm of the mobile device 100-1 of FIG. 16.

In operation 2210, the algorithm receives periodic current battery level information from a connected peripheral device. The periodic current battery level information may represent the remaining current battery level of the peripheral device.

In operation 2220, the algorithm determines whether the peripheral device is used for any current or future applications, for example, health monitoring. The algorithm may interrogate a controller within the mobile device, for example, the controller 814 of FIG. 20, to determine whether there are any current or future applications that use the connected peripheral device.

The algorithm may interrogate the peripheral device to determine whether the peripheral device is used for current or future applications.

When the algorithm determines that there are no current or future applications used for the connected peripheral device, the algorithm transitions back to operation 2210 and waits to receive further periodic battery level information. Otherwise, the algorithm continues in operation 2230.

In operation 2230, the algorithm transmits a received current battery level $R_{pa}$, for example, of the peripheral device to the controller 814 of the mobile device 100-1, and in operation 2240, the algorithm receives from the controller information regarding an 'intelligent' determination of battery life to perform the current and/or future applications, $P_{bb}$.

In operation 2250, the algorithm compares the current battery level $R_{pa}$ received from the peripheral device with the 'intelligent' determination $P_{bb}$ received from the controller. When the algorithm determines that $R_{pa}$ is greater than $P_{bb}$, the algorithm determines that the remaining battery life of the peripheral device is enough to perform the current and/or future applications, and therefore, transitions back to operation 2210 and waits to receive further periodic battery level information. However, when the algorithm determines that $R_{pa}$ is not greater than $P_{bb}$, the algorithm determines that the remaining battery life of the peripheral device is not enough to run current and/or future applications, and thus transitions to operation 2260.

In operation 2260, the algorithm transmits a warning notification or a 'battery low' notification to the controller 814 of the mobile device 100-1. In response to this notification, the controller 814 of the mobile device 100-1 may utilize the above-described exemplary embodiments and stop some applications to extend the battery life of the peripheral device.

The algorithm may make the determination in operation 2250, taking into account an additional safety margin to prepare for unforeseen battery discharge scenarios or temperature effects.

Also, the algorithm may determine power levels for a plurality of connected peripheral devices.

The controller of the mobile device may determine $P_{bb}$ based on, for example, the battery power level $D_{bp}$ of the peripheral device, power $a_{pu}$ for the user to carry out a current activity, power $a_{fu}$ by the user to carry out a scheduled activity in the future, and a current battery power value $M_{bp}$ of the mobile device. Equation 1 is an equation for determining $P_{bb}$, and $P_{bb}$ may be the minimum power to carry out an activity for a user.

$$Pbb = f(Dbp, Mbp, apu, afu) \quad (1)$$

In one or more exemplary embodiments related to health monitoring applications, a third party may remotely monitor mobile device usage information of the user. For example, a remote agency or a hospital may wish to monitor health application data of the user to check a health status of a patient/user.

Also, the third party may remotely gather data relating to, for example, heart rate measurements taken via a peripheral device, to determine ongoing treatment or assessments of the user/patient. Therefore, the third party may remotely control functions of the mobile device.

When the user ignores a battery notification, for example, the notification of FIG. 10B, the mobile device may automatically notify the third party, for example, via an SMS. The third party may be able to remotely access the mobile device of the user for 'critical' applications, and disable one or more applications to save remaining battery life to run the 'critical' applications.

The user may be notified that there is not enough power for a future heart rate scan, for example, in 2 hours. When the user ignores the battery notification and does not recharge his or her device or closes one or more applications suggested by the controller of the mobile device 100-1, the mobile device 100-1 may notify the remote third party. As a result, the remote third party may inform the user by directly contacting the user to charge the mobile device and/or the peripheral device, or unilaterally and remotely control the mobile device and close one or more applications.

Furthermore, an importance level determined by the user for various applications may be remotely changed by the third party.

The mobile device 100-1 may transmit battery level information related to the peripheral device to the third party. The battery level information may additionally include information from the algorithm 980 of FIG. 20 or the algorithm of FIG. 16.

Figure 23:
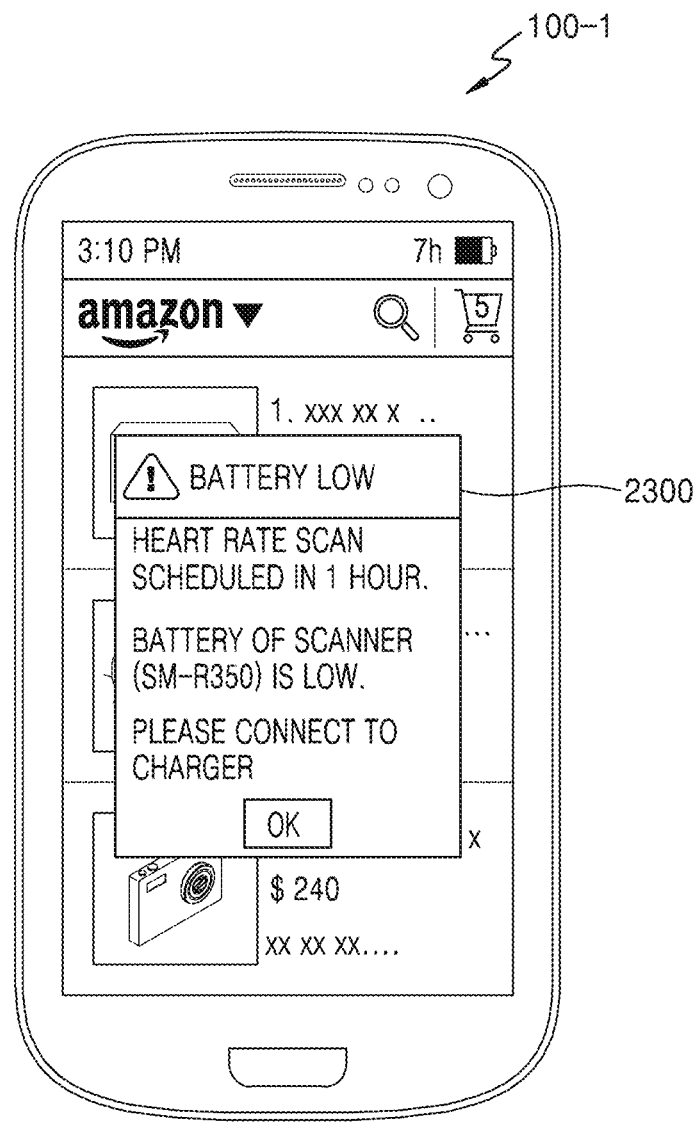
FIG. 23 is a diagram of a 'battery low' notification message displayed on a mobile device, according to the exemplary embodiment.

FIG. 23 is a diagram of a 'battery low' notification message displayed on the mobile device 100-1, according to the exemplary embodiment.

FIG. 23 illustrates a screen of the mobile device 100-1 that provides a battery notification based on battery information of a peripheral device, according to an exemplary embodiment.

When the peripheral device is to perform a future event, the mobile device 100-1 checks remaining battery life of the peripheral device 600-1 via communication with the peripheral device, and determines whether battery capacity of the peripheral device is enough to perform the future event. In this case, a power profile of a future application related to the future event may be referenced. For example, the power profile of the future application may include information of the peripheral device, such as an ID of a connected peripheral device, power consumption of the peripheral device.

As shown in FIG. 23, when a heart rate scan event is scheduled in 1 hour and battery capacity of the mobile device 100-1 is sufficient but battery capacity of the peripheral device is insufficient, a battery notification 2300 including a message "Heart rate scan scheduled in 1 hour. Battery of the scanner(SM-R350) is low. Please connect to charger" may be displayed to request the user to charge the peripheral device.

The term 'module' used in one or more exemplary embodiments may indicate, for example, a unit including one selected from hardware, software, firmware, and a combination thereof. The module may be interchangeably used with terms such as 'unit,' 'logic,' 'logical block,' 'component,' or 'circuit.' The module may be a minimum unit or a portion of an integrally formed component. The module may be a minimum unit or a portion performing one or more functions. The module may be implemented mechanically or electronically. For example, a module according to one or more exemplary embodiments may include at least one of an application-specific integrated circuit (ASIC) chip, field-programmable gate arrays (FPGAs), and a programmable-logic device, which perform operations that are already known or to be developed.

While not restricted thereto, an exemplary embodiment can be embodied as computer-readable code on a computer-readable recording medium. For example, a control program that controls the above-described operations may be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units can include circuitry, a processor, a microprocessor, etc., and may execute a computer program stored in a computer-readable medium.

The module or the programming module according to one or more exemplary embodiments may include at least one of the aforementioned components, omit some of the aforementioned components, or additionally include other components. Operations performed by the module, the programming module, or other components according to one or more exemplary embodiments may be performed sequentially, in parallel, repeatedly, or heuristically. Some operations may be performed in a different order, omitted, or additionally include other operations.

According to one or more exemplary embodiments, in a storage medium that stores instructions, the instructions are set such that at least one processor performs at least one operation when the instructions are executed by the at least one processor. The at least one operation may include determining a future application to be run in the mobile device, determining whether a current remaining battery life is enough to run a future application based on power consumption of at least one application that is currently-used or to be run before the future application, and selectively outputting a notification informing battery insufficiency of the mobile device based on the determination.

The exemplary embodiments are described with reference to various functional units and processors. However, it will be apparent that any suitable distribution of functionality between different functional units or processors may be used without detracting from the exemplary embodiments. For example, functionality illustrated to be performed by separate processors or controllers may be performed by the same processor or controller and in some examples these functions may be interchangeable. Hence, references to functional units are only to be seen as references to suitable units for providing the described functionality, rather than indicative of a strict logical or physical structure or organization.

The foregoing exemplary embodiments and advantages are examples and are not to be construed as limiting. The present teaching can be readily applied to other types of apparatuses. Also, the description of exemplary embodiments is intended to be illustrative, and not to limit the scope of the claims, and many alternatives, modifications, and variations will be apparent to those skilled in the art.

What is claimed is:

1. A method of providing a battery power notification in a mobile device to a user, the method comprising:
   determining a future application to be run on the mobile device;
   determining whether a remaining battery life of the mobile device is enough to run the future application, based on a power consumption of a preceding application running before the future application;
   receiving, from a peripheral device that is connected with the mobile device, information on a remaining battery life of the peripheral device, the peripheral device being used in running at least a part of the future application or being used in performing a predefined function in association with the future application;
   determining whether the remaining battery life of the peripheral device is enough to run the at least the part of the future application or to perform the predefined function;
   outputting a notification indicating a battery insufficiency of the mobile device in response to the determining that the remaining battery life of the mobile device is not enough; and
   outputting an alarm indicating a battery insufficiency of the peripheral device in response to the determining that the remaining battery life of the peripheral device is not enough.

2. The method of claim 1, wherein the determining the future application comprises determining the future application based on a usage pattern of the user of the mobile device.

3. The method of claim 1, further comprising:
   receiving, from a remote device, a request to run an application,
   wherein the determining the future application comprises determining the requested application as the future application.

4. The method of claim 3, wherein the outputting comprises outputting, to the remote device, the notification indicating the battery insufficiency of the mobile device in response to the determining that the remaining battery life is not enough.

5. The method of claim 3, further comprising closing a currently running application of the mobile device to save battery power to perform an operation based on the request.

6. The method of claim 1, wherein the outputting comprises displaying a list of applications to be closed, among currently running applications or hardware modules of the mobile device, to save energy to run the future application.

7. The method of claim 6, wherein the list comprises applications with an importance level less than an importance level of the future application.

8. The method of claim 1, further comprising:
   calculating a remaining runtime of a currently running application of the mobile device, based on a power consumption of the currently running application; and
   displaying the remaining runtime.

9. The method of claim 1, further comprising:
   monitoring usage of the mobile device for a period of time;
   generating a power profile indicating power consumptions of currently running applications of the mobile device, based on the monitored usage; and
   determining a power consumption of the future application and the power consumption of the preceding application based on the power profile.

10. A mobile device comprising:
    a controller configured to:
       determine a future application to run on the mobile device;
       determine whether a remaining battery life of the mobile device is enough to run the future application, based on a power consumption of a preceding application running before the future application;

receive, from a peripheral device that is connected with the mobile device, information on a remaining battery life of the peripheral device, the peripheral device being used in running at least a part of the future application or being used in performing a predefined function in association with the future application;

determine whether the remaining battery life of the peripheral device is enough to run the at least the part of the future application or to perform the predefined function;

output a notification indicating a battery insufficiency of the mobile device in response to the controller determining that the remaining battery life of the mobile device is not enough; and output an alarm indicating a battery insufficiency of the peripheral device in response to the determining that the remaining battery life of the peripheral device is not enough.

11. The mobile device of claim 10, wherein the controller is configured to determine the future application based on a usage pattern of a user of the mobile device.

12. The mobile device of claim 10, wherein the controller is further configured to:
receive, from a remote device, a request to run an application; and
determine the requested application as the future application.

13. The mobile device of claim 12, wherein the controller is configured to output, to the remote device, the notification indicating the battery insufficiency of the mobile device in response to the controller determining that the remaining battery life is not enough.

14. The mobile device of claim 12, wherein the controller is further configured to close a currently running application of the mobile device to save battery power to perform an operation based on the request.

15. The mobile device of claim 10, further comprising a display,
wherein the controller is configured to control the display to display a list of applications to be closed, among currently running applications or hardware modules of the mobile device, to save energy to run the future application.

16. The mobile device of claim 10, further comprising a display,
wherein the controller is further configured to:
calculate a remaining runtime of a currently running application of a mobile device, based on a power consumption of the currently running application; and
control the display to display the remaining runtime.

17. The mobile device of claim 10, wherein the controller is further configured to:
monitor usage of the mobile device for a period of time;
generate a power profile indicating power consumptions of currently running applications of the mobile device, based on the monitored usage; and
determine a power consumption of the future application and the power consumption of the preceding application based on the power profile.

18. A non-transitory computer-readable storage medium storing a program comprising instructions for causing a computer to perform a method of providing a battery power notification in a mobile device to a user, the method comprising:
determining a future application to be run on the mobile device;
determining whether a remaining battery life of the mobile device is enough to run the future application, based on a power consumption of a preceding application running before the future application;
receiving, from a peripheral device that is connected with the mobile device, information on a remaining battery life of the peripheral device, the peripheral device being used in running at least a part of the future application or being used in performing a predefined function in association with the future application;
determining whether the remaining battery life of the peripheral device is enough to run the at least the part of the future application or to perform the predefined function;
outputting a notification indicating a battery insufficiency of the mobile device in response to the determining that the remaining battery life of the mobile device is not enough; and
outputting an alarm indicating a battery insufficiency of the peripheral device in response to the determining that the remaining battery life of the peripheral device is not enough.

19. A mobile device comprising:
a controller configured to:
determine a future event to run on the mobile device, among events, based on importance levels of the events;
determine whether a remaining capacity of a battery of the mobile device is enough to run the future event, based on a power that is consumed by a preceding event running before the future event, among the events;
receive, from a peripheral device that is connected with the mobile device, information on a remaining battery life of the peripheral device, the peripheral device being used in running at least a part of the future event or being used in performing a predefined function in association with the future event;
determine whether the remaining battery life of the peripheral device is enough to run the at least the part of the future event or to perform the predefined function;
output a notification indicating that the remaining capacity of the battery of the mobile device is not enough in response to the controller determining that the remaining capacity of the battery of the mobile device is not enough; and
output an alarm indicating a battery insufficiency of the peripheral device in response to the determining that the remaining battery life of the peripheral device is not enough.

20. The mobile device of claim 19, further comprising a display,
wherein the controller is further configured to control the display to display the notification comprising the future event, information that the remaining capacity of the battery is not enough to perform the future event, and an action to be performed so that the remaining capacity of the battery is enough to perform the future event.

* * * * *